(12) United States Patent
Huang et al.

(10) Patent No.: US 11,595,970 B2
(45) Date of Patent: Feb. 28, 2023

(54) UE-SPECIFIC SLOT STRUCTURE CONFIGURATION

(71) Applicant: QUALCOMM Incorporated, San Diego, CA (US)

(72) Inventors: Yi Huang, San Diego, CA (US); Renqiu Wang, San Diego, CA (US); Wanshi Chen, San Diego, CA (US); Hao Xu, Beijing (CN); Peter Gaal, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/906,813

(22) Filed: Feb. 27, 2018

(65) Prior Publication Data

US 2018/0279325 A1   Sep. 27, 2018

Related U.S. Application Data

(60) Provisional application No. 62/476,390, filed on Mar. 24, 2017.

(51) Int. Cl.
*H04W 72/12* (2009.01)
*H04L 5/14* (2006.01)
(Continued)

(52) U.S. Cl.
CPC .......... *H04W 72/12* (2013.01); *H04L 5/0044* (2013.01); *H04L 5/0053* (2013.01);
(Continued)

(58) Field of Classification Search
CPC ... H04L 5/0044; H04L 5/0053; H04L 5/0094; H04L 5/1469; H04L 41/08; H04L 5/14; H04W 72/1226; H04W 72/12
See application file for complete search history.

(56) References Cited

U.S. PATENT DOCUMENTS

| | | |
|---|---|---|
| 2005/0157694 A1 | 7/2005 | Lu et al. |
| 2006/0153107 A1 | 7/2006 | Ji |
| | (Continued) | |

FOREIGN PATENT DOCUMENTS

| | | |
|---|---|---|
| CN | 101594705 A | 12/2009 |
| CN | 105247804 A | 1/2016 |
| | (Continued) | |

OTHER PUBLICATIONS

International Search Report and Written Opinion—PCT/US2018/020484—ISA/EPO—dated Jun. 5, 2018.
(Continued)

*Primary Examiner* — Anez C Ebrahim
(74) *Attorney, Agent, or Firm* — Loza & Loza, LLP

(57) ABSTRACT

Aspects of the present disclosure relate to wireless communication systems configured to provide user equipment (UE)-specific slot structures based on the individual propagation delay experienced by each UE. In some examples, the duration of uplink transmissions for a particular UE within a slot may be configured based on the propagation delay between the base station and that particular UE. For example, the duration of an uplink burst and/or an uplink traffic transmission may be configured based on the propagation delay. In addition, a downlink burst within a slot may be configured for a particular UE on the propagation delay experienced by that UE. Downlink traffic transmissions may further be configured for the cell based on the maximum propagation delay experienced by the UEs in the cell.

31 Claims, 16 Drawing Sheets

(51) Int. Cl.
*H04L 43/16* (2022.01)
*H04L 43/10* (2022.01)
*H04W 24/08* (2009.01)
*H04L 41/08* (2022.01)
*H04L 5/00* (2006.01)
*H04L 43/0852* (2022.01)

(52) U.S. Cl.
CPC ............ *H04L 5/0094* (2013.01); *H04L 5/14* (2013.01); *H04L 5/1469* (2013.01); *H04L 41/08* (2013.01); *H04L 43/0858* (2013.01); *H04L 43/10* (2013.01); *H04L 43/16* (2013.01); *H04W 24/08* (2013.01); *H04W 72/1226* (2013.01)

(56) References Cited

U.S. PATENT DOCUMENTS

| | | | |
|---|---|---|---|
| 2011/0117942 A1 | 5/2011 | Kazmi et al. | |
| 2011/0249688 A1 | 10/2011 | Liu | |
| 2012/0039239 A1* | 2/2012 | Park | H04B 7/155 370/315 |
| 2014/0064247 A1* | 3/2014 | Teyeb | H04W 36/02 370/331 |
| 2015/0305025 A1 | 10/2015 | Moraru et al. | |
| 2015/0334702 A1* | 11/2015 | Ji | H04L 5/1469 370/280 |

FOREIGN PATENT DOCUMENTS

| | | |
|---|---|---|
| WO | 2014134957 A1 | 9/2014 |
| WO | 2016202401 A1 | 12/2016 |

OTHER PUBLICATIONS

ZTE: "Remaining Aspects of Relay Timing", 3GPP Draft; R1-103581 Relay Timing, 3rd Generation Partnership Project (3GPP), Mobile Competence Centre; 650, Route Des Lucioles; F-06921 Sophia-Antipolis Cedex; France, vol. RAN WG1, No. No. Dresden, Germany; Jun. 28, 2010, Jun. 23, 2010, XP050449403, [retrieved on Jun. 23, 2010], 5 pages.

Huawei, et al., "Considerations on DL DPCH Slot Format for DCH Enhancement", 3GPP TSG RAN WG1 Meeting #75, R1-135680, San Francisco, USA, Nov. 11-15, 2013, pp. 1-5, Nov. 15, 2013.

Taiwan Search Report—TW107106755—TIPO—dated Jul. 5, 2021.

* cited by examiner

DL-Centric Slot

UL-Centric Slot

UE-SPECIFIC SLOT STRUCTURE CONFIGURATION

PRIORITY CLAIM

This application claims priority to and the benefit of Provisional Patent Application No. 62/476,390 filed in the U.S. Patent and Trademark Office on Mar. 24, 2017, the entire content of which is incorporated herein by reference as if fully set forth below in its entirety and for all applicable purposes.

TECHNICAL FIELD

The technology discussed below relates generally to wireless communication systems, and more particularly, to slot structure configuration in wireless communication systems.

INTRODUCTION

In a fourth-generation (4G) wireless communication network that follows standards for an evolved UMTS Terrestrial Radio access network (eUTRAN, also commonly known as LTE), over-the-air transmissions of information are assigned to various physical channels or signals. Very generally, these physical channels or signals carry user data traffic and control information. For example, a Physical Downlink Shared Channel (PDSCH) typically carries downlink user data traffic, while the Physical Uplink Shared Channel (PUSCH) typically carries uplink user data traffic. In addition, a Physical Downlink Control Channel (PDCCH) typically carries downlink control information (DCI) providing downlink assignments and/or uplink grants of time-frequency resources to a user equipment (UE) or a group of UEs, while a Physical Uplink Control Channel (PUCCH) typically carries uplink control information, including acknowledgement information, channel quality information, scheduling requests and multiple-input-multiple-output (MIMO) feedback information. Furthermore, various uplink and downlink signals may also be transmitted to aid in channel estimation and coherent demodulation. Examples of such signals include the downlink reference signal, demodulation reference signal and sounding reference signal.

These channels and signals are commonly time-divided into frames, and the frames may then be further subdivided into subframes, slots, and symbols. In general, subframes or slots follow a pattern where the control information is time division multiplexed (TDM) with the data information, with the control information being transmitted at the beginning and/or end of a subframe or slot.

Next generation (e.g., 5G or New Radio) wireless communication networks may include both a downlink burst for transmitting the PDCCH at the beginning of each slot and a short uplink burst for transmitting a short PUCCH and/or short PUSCH at the end of each slot. In addition, each slot may further include a gap or guard period providing a time separation between downlink and uplink transmissions within the slot. The guard period may further serve to compensate for the propagation delay between the base station and user equipment. However, each UE may experience a different propagation delay, thus providing challenges to configuring the slot structure utilized in a cell.

BRIEF SUMMARY OF SOME EXAMPLES

The following presents a simplified summary of one or more aspects of the present disclosure, in order to provide a basic understanding of such aspects. This summary is not an extensive overview of all contemplated features of the present disclosure, and is intended neither to identify key or critical elements of all aspects of the present disclosure nor to delineate the scope of any or all aspects of the present disclosure. Its sole purpose is to present some concepts of one or more aspects of the present disclosure in a simplified form as a prelude to the more detailed description that is presented later.

Various aspects of the present disclosure provide techniques for configuring UE-specific slot structures based on the individual propagation delay experienced by each UE. In some examples, the duration of uplink transmissions for a particular UE within a slot may be configured based on the propagation delay between the base station and that particular UE. For example, the duration of an uplink burst and/or an uplink traffic transmission may be configured based on the propagation delay. In addition, a downlink burst within a slot may be configured for a particular UE on the propagation delay experienced by that UE. Downlink traffic transmissions may further be configured for the cell based on the maximum propagation delay experienced by the UEs in the cell.

In one aspect of the disclosure, a method of wireless communication between a scheduling entity and a plurality of scheduled entities in a cell utilizing a time division duplex (TDD) carrier including a plurality of slots is provided. The method includes configuring an uplink transmission duration of a slot structure for a scheduled entity of the plurality of scheduled entities based on a propagation delay between the scheduling entity and the scheduled entity, transmitting slot structure configuration information indicating the slot structure comprising the uplink transmission duration to the scheduled entity, and communicating with the scheduled entity utilizing the slot structure.

Another aspect of the disclosure provides a scheduling entity within a wireless communication network. The scheduling entity includes a processor, a memory communicatively coupled to the processor, and a transceiver communicatively coupled to the processor. The processor is configured to configure an uplink transmission duration of a slot structure for a scheduled entity of a plurality of scheduled entities within a cell served by the scheduling entity based on a propagation delay between the scheduling entity and the scheduled entity, transmit slot structure configuration information indicating the slot structure comprising the uplink transmission duration to the scheduled entity, and communicate with the scheduled entity utilizing the slot structure via the transceiver.

Another aspect of the disclosure provides a scheduling entity within a wireless communication network. The scheduling entity includes means for configuring an uplink transmission duration of a slot structure for a scheduled entity of a plurality of scheduled entities within a cell served by the scheduling entity based on a propagation delay between the scheduling entity and the scheduled entity, means for transmitting slot structure configuration information indicating the slot structure comprising the uplink transmission duration to the scheduled entity, and means for communicating with the scheduled entity utilizing the slot structure.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
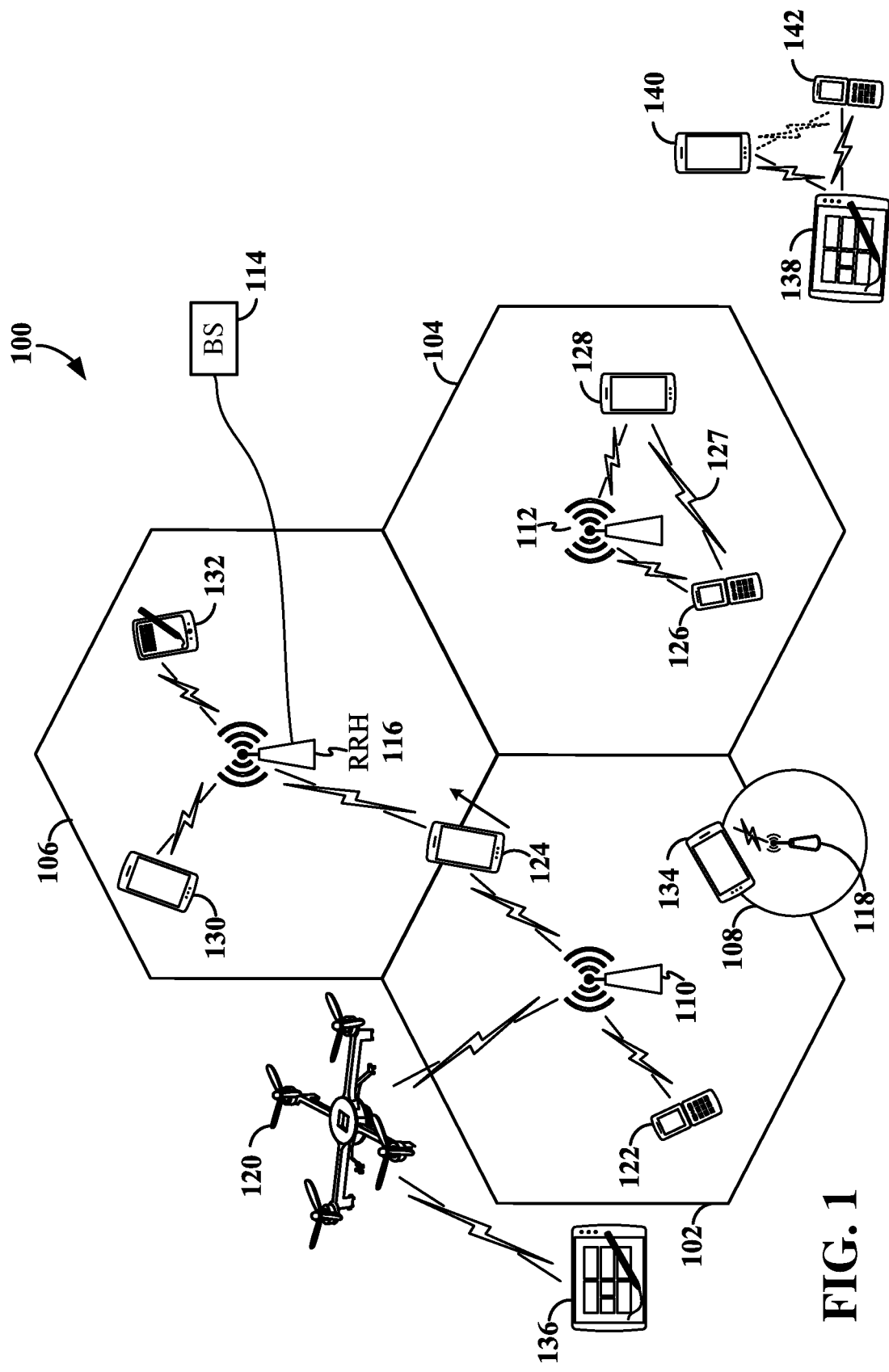
FIG. 1 is a diagram illustrating an example of a radio access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of a radio access network 100 is provided. The radio access network 100 may be a next generation (e.g., fifth generation (5G) or New Radio (NR)) radio access network or a legacy (3G or 4G) radio access network. In addition, one or more nodes in the radio access network 100 may be next generation nodes or legacy nodes.

As used herein, the term legacy radio access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation radio access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum and Korea Telecom SIG.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
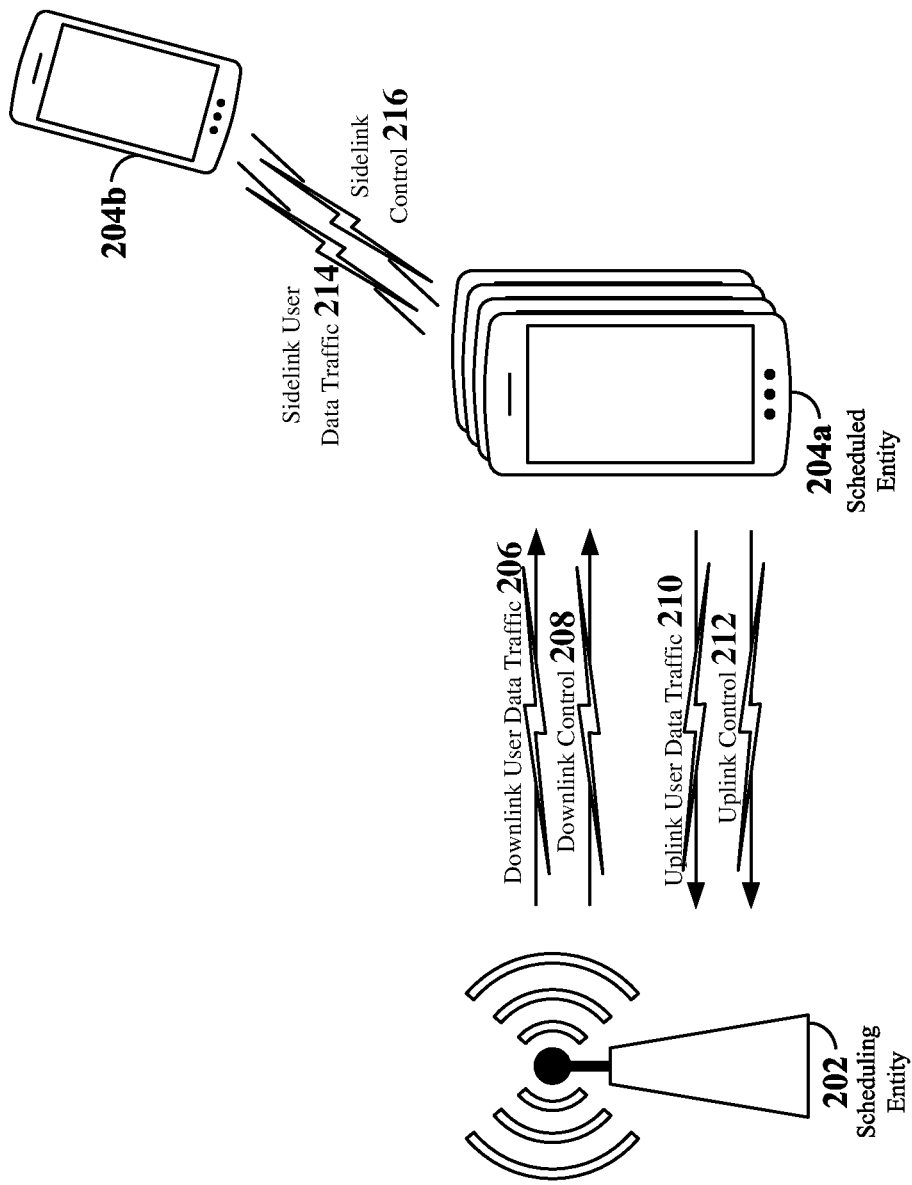
FIG. 2 is a block diagram conceptually illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink user data traffic 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS (e.g., handshake) may enable different scheduled entities performing sidelink communications to negotiate the availability of the sidelink channel prior to communication of the sidelink user data traffic 214. The PSHICH may include HARQ acknowledgment information and/or a HARQ indicator from a destination device, so that the destination may acknowledge traffic received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
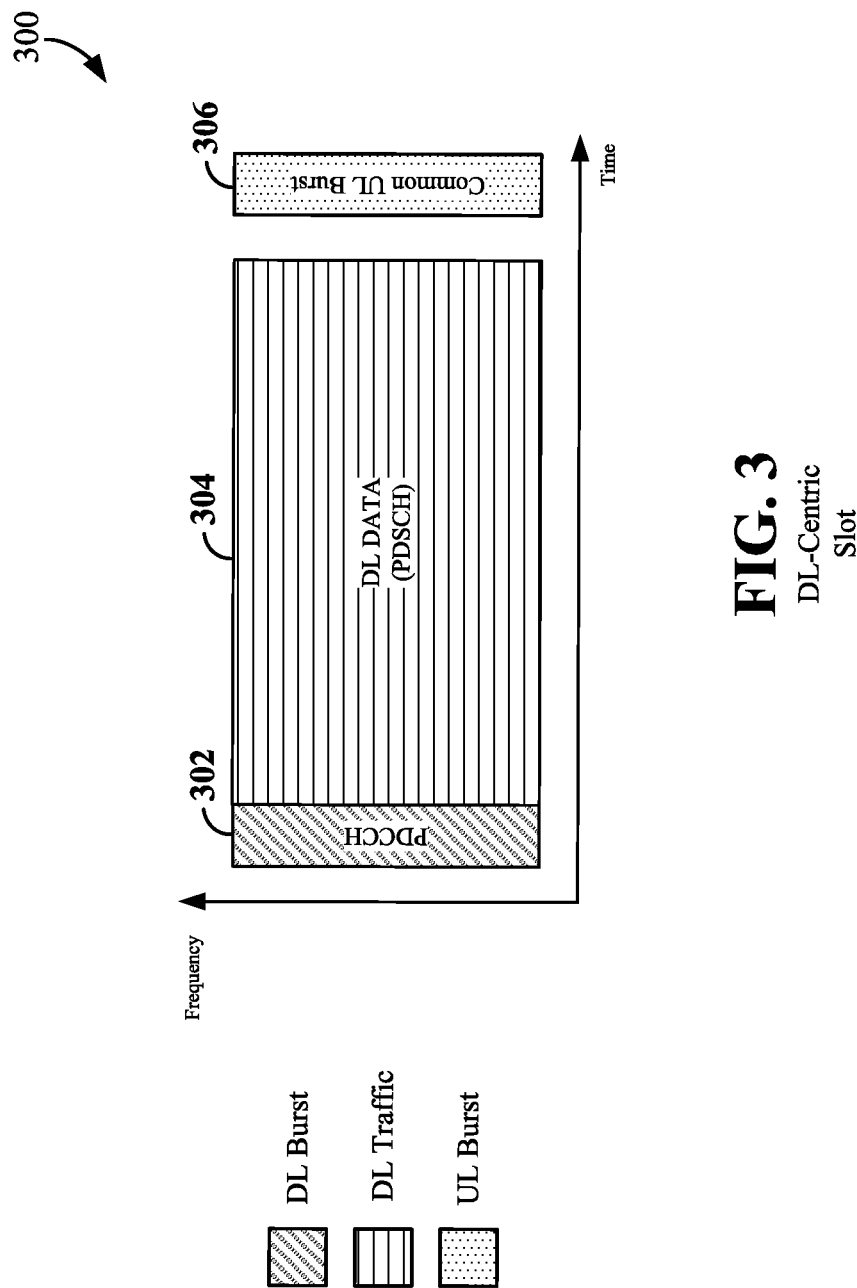
FIG. 3 is a diagram illustrating an example of a downlink (DL)-centric slot according to some aspects of the present disclosure.

According to various aspects of the present disclosure, wireless communication may be implemented by dividing transmissions, in time, into frames, wherein each frame may be further divided into slots. These slots may be DL-centric or UL-centric, as described below. For example, FIG. 3 is a diagram illustrating an example of a downlink (DL)-centric slot 300 according to some aspects of the present disclosure. The DL-centric slot is referred to as a DL-centric slot because a majority (or, in some examples, a substantial portion) of the slot includes DL data. In the example shown in FIG. 3, time is illustrated along a horizontal axis, while frequency is illustrated along a vertical axis. The time-frequency resources of the DL-centric slot 300 may be divided into a DL burst 302, a DL traffic portion 304 and an UL burst 306.

The DL burst 302 may exist in the initial or beginning portion of the DL-centric slot. The DL burst 302 may include any suitable DL information in one or more channels. In some examples, the DL burst 302 may include various scheduling information and/or control information corresponding to various portions of the DL-centric slot. In some configurations, the DL burst 302 may be a physical DL control channel (PDCCH), as indicated in FIG. 3. The DL-centric slot may also include a DL traffic portion 304. The DL traffic portion 304 may sometimes be referred to as the payload of the DL-centric slot. The DL traffic portion 304 may include the communication resources utilized to communicate DL user data traffic from the scheduling entity 202 (e.g., eNB) to the scheduled entity 204 (e.g., UE). In some configurations, the DL traffic portion 304 may be a physical DL shared channel (PDSCH).

The UL burst 306 may include any suitable UL information in one or more channels. In some examples, the UL burst 306 may include feedback information corresponding to various other portions of the DL-centric slot. For example, the UL burst 306 may include feedback information corresponding to the control portion 302 and/or DL traffic portion 304. Non-limiting examples of feedback information may include an ACK signal, a NACK signal, a HARQ indicator, and/or various other suitable types of information. The UL burst 306 may include additional or alternative information, such as information pertaining to random access channel (RACH) procedures, scheduling requests (SRs), and various other suitable types of information.

As illustrated in FIG. 3, the end of the DL traffic portion 304 may be separated in time from the beginning of the UL burst 306. This time separation may sometimes be referred to as a gap, a guard period, a guard interval, and/or various other suitable terms. This separation provides time for the switchover from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

Figure 4:
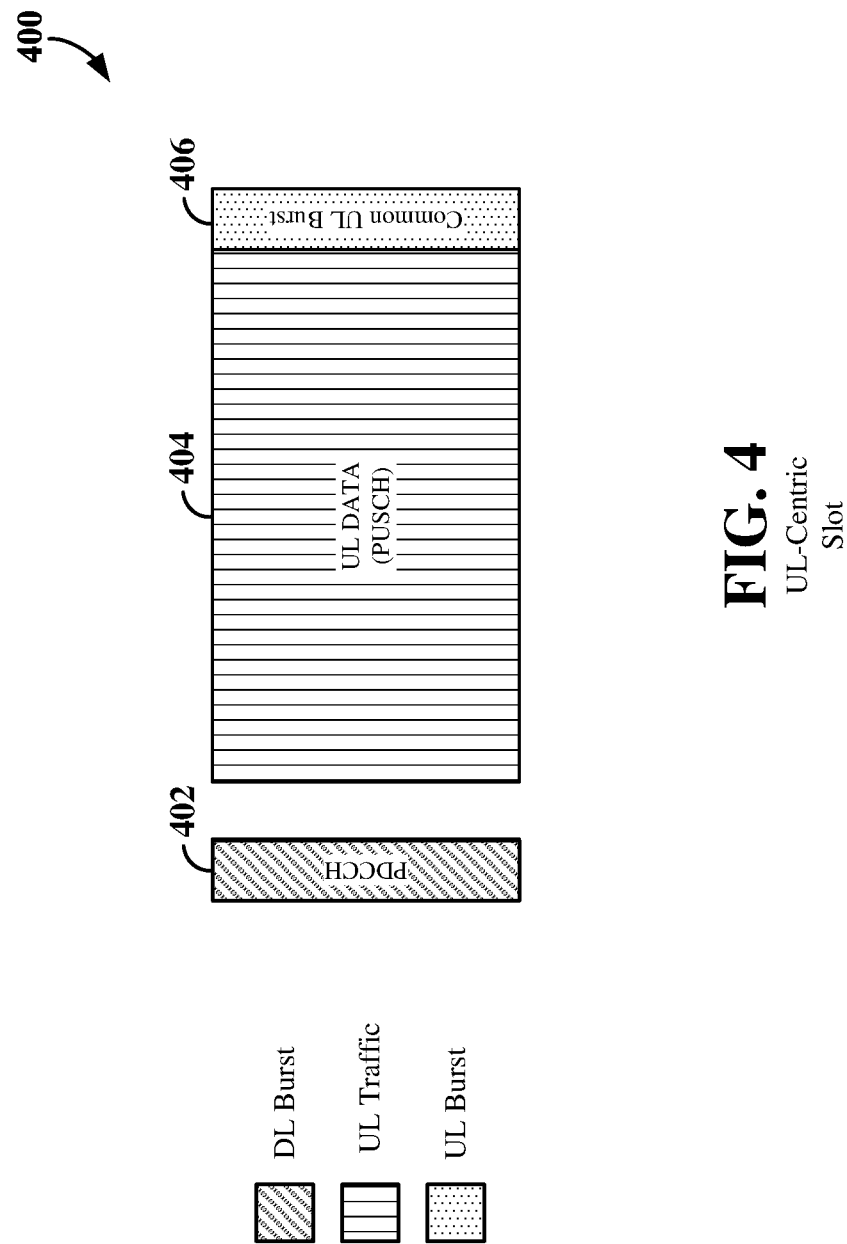
FIG. 4 is a diagram illustrating an example of an uplink (UL)-centric slot according to some aspects of the present disclosure.

FIG. 4 is a diagram showing an example of an uplink (UL)-centric slot 400 according to some aspects of the present disclosure. The UL-centric slot is referred to as a UL-centric slot because a majority (or, in some examples, a substantial portion) of the slot includes UL data. In the example shown in FIG. 4, time is illustrated along a horizontal axis, while frequency is illustrated along a vertical axis. The time-frequency resources of the UL-centric slot 400 may be divided into a DL burst 402, an UL traffic portion 404 and an UL burst 406.

The DL burst 402 may exist in the initial or beginning portion of the UL-centric slot. The DL burst 402 in FIG. 4 may be similar to the DL burst 302 described above with reference to FIG. 3. The UL-centric slot may also include an UL traffic portion 404. The UL traffic portion 404 may sometimes be referred to as the payload of the UL-centric slot. The UL traffic portion 404 may include the communication resources utilized to communicate UL user data traffic from the scheduled entity 204 (e.g., UE) to the scheduling entity 202 (e.g., base station, such as an eNB or gNB). In some configurations, the UL traffic portion 404 may be a physical UL shared channel (PUSCH). As illustrated in FIG. 4, the end of the DL burst 402 may be separated in time from the beginning of the UL traffic portion 404. This time, separation may sometimes be referred to as a gap, guard period, guard interval, and/or various other suitable terms. This separation provides time for the switchover from DL communication (e.g., reception operation by the scheduling entity 202 (e.g., UE)) to UL communication (e.g., transmission by the scheduling entity 202 (e.g., UE)).

The UL burst 406 in FIG. 4 may be similar to the UL burst 306 described above with reference to FIG. 3. The UL burst 406 may additionally or alternatively include information pertaining to channel quality indicator (CQI), sounding reference signals (SRSs), and various other suitable types of information. In some examples, the UL burst 406 may have a short duration (e.g., one or more OFDM symbols) at the end of the UL-centric slot 400. In other examples, instead of including a separate UL burst 406 for the PUCCH (and other UL information), the PUSCH may be transmitted across both the UL traffic portion 404 and the UL burst 406, and the PUCCH (and other UL information) may be frequency-division multiplexed with the PUSCH within the same UL-centric slot 400. In this example, the PUCCH may have a longer duration (e.g., more than two OFDM symbols). One of ordinary skill in the art will understand that the foregoing is merely one example of an UL-centric slot, and alternative structures having similar features may exist without necessarily deviating from the aspects described herein.

In either the DL-centric slot 300 shown in FIG. 3 or the UL-centric slot 400 shown in FIG. 4, the guard period between downlink transmissions and uplink transmissions may also serve to compensate for the propagation delay between the base station (e.g., eNB or gNB) and user equipment (UE). As used herein, the term propagation delay refers to the amount of time required for a signal to propagate over the air from a transmitter to a receiver (e.g., the time between transmission of the beginning of a signal and reception of the beginning of the signal). Each UE (scheduled entity) may experience a different propagation delay depending on the location of the UE within the cell. For example, the propagation delay experienced by UEs near the edge of the cell, referred to herein as cell-edge UEs, may be greater than the propagation delay experienced by UEs located near the center of the cell, referred to herein as cell-center UEs. Similarly, the propagation delay experienced by UEs within large macrocells may be greater than the propagation delay experienced by UEs within small cells.

Therefore, in accordance with aspects of the present disclosure, to avoid interference between uplink and downlink transmissions in the cell, the slot structure of UL-centric slots 400 and DL-centric slots 300 may be configured for each UE to provide appropriate guard periods therein based on the respective propagation delay experienced by each of the UEs. In some examples, UE-specific slot structures (e.g., UE-specific DL-centric slot structures and UE-specific UL-centric slot structures) for each UE may be configured to provide different uplink transmission durations based on the respective propagation delays between the base station (scheduling entity) and the UEs (scheduled entities). By providing different uplink transmission durations, the base station can ensure that all uplink transmissions initiated within a particular slot by UEs within a cell are received at the base station within the duration of that particular slot. For example, UEs with small propagation delays (e.g., propagation delays less than a threshold), such as cell-center UEs or UEs in small cells, may be configured with a slot structure (UL-centric and/or DL-centric) that includes two symbols for the uplink burst, whereas UEs with large propagation delays (e.g., propagation delays greater than a threshold), such as cell-edge UEs or UEs in macrocells, may be configured with a slot structure (UL-centric and/or DL-centric) that includes a single symbol for the uplink burst.

For DL-centric slots 300, the downlink transmission duration may further be configured for all UEs to avoid interference between downlink transmissions and uplink transmissions at cell-edge UEs (or UEs within macrocells). In this example, the downlink transmission duration is cell-specific instead of UE-specific, but is configured to accommodate different propagation delays in the cell. For example, the downlink transmission duration may be configured to ensure there is a sufficient guard period between reception of downlink transmissions and initiation of uplink transmissions at cell-edge UEs or UEs in macrocells. In addition, the downlink transmission duration may be configured to enable sufficient time for the base station to receive the uplink transmissions from cell-edge UEs or UEs within macrocells within the same slot duration. Since cell-center UEs may receive the downlink transmissions prior to cell-edge UEs, the cell-center UEs may effectively implement a larger guard period than cell-edge UEs between reception of downlink transmissions and initiation of uplink transmissions, as determined by the scheduling information for uplink transmissions included in the downlink burst of the DL-centric slot.

For UL-centric slots 400, the uplink transmission duration of both the uplink burst and the uplink traffic portion may be configured for each UE based on the respective propagation delay experienced by that UE. For example, the slot structure of UL-centric slots for cell-center UEs may be configured to include additional PUSCH and/or PUCCH symbols in the uplink traffic portion and/or uplink burst. Likewise, the slot structure of UL-centric slots for cell-edge UEs may be configured to include fewer PUSCH and/or PUCCH symbols in the uplink traffic portion and/or uplink burst to ensure all uplink transmissions are received from cell-edge UEs within the UL-centric slot duration. In addition, the downlink burst duration may be configured for all UEs in the cell (e.g., the downlink burst may be cell-specific, instead of UE-specific). However, the downlink burst may be configured to include downlink control information (DCI) for cell-edge UEs within the first symbol of the downlink burst to ensure cell-edge UEs receive their DCI prior to initiation of uplink transmissions by cell-center UEs.

Figure 5:
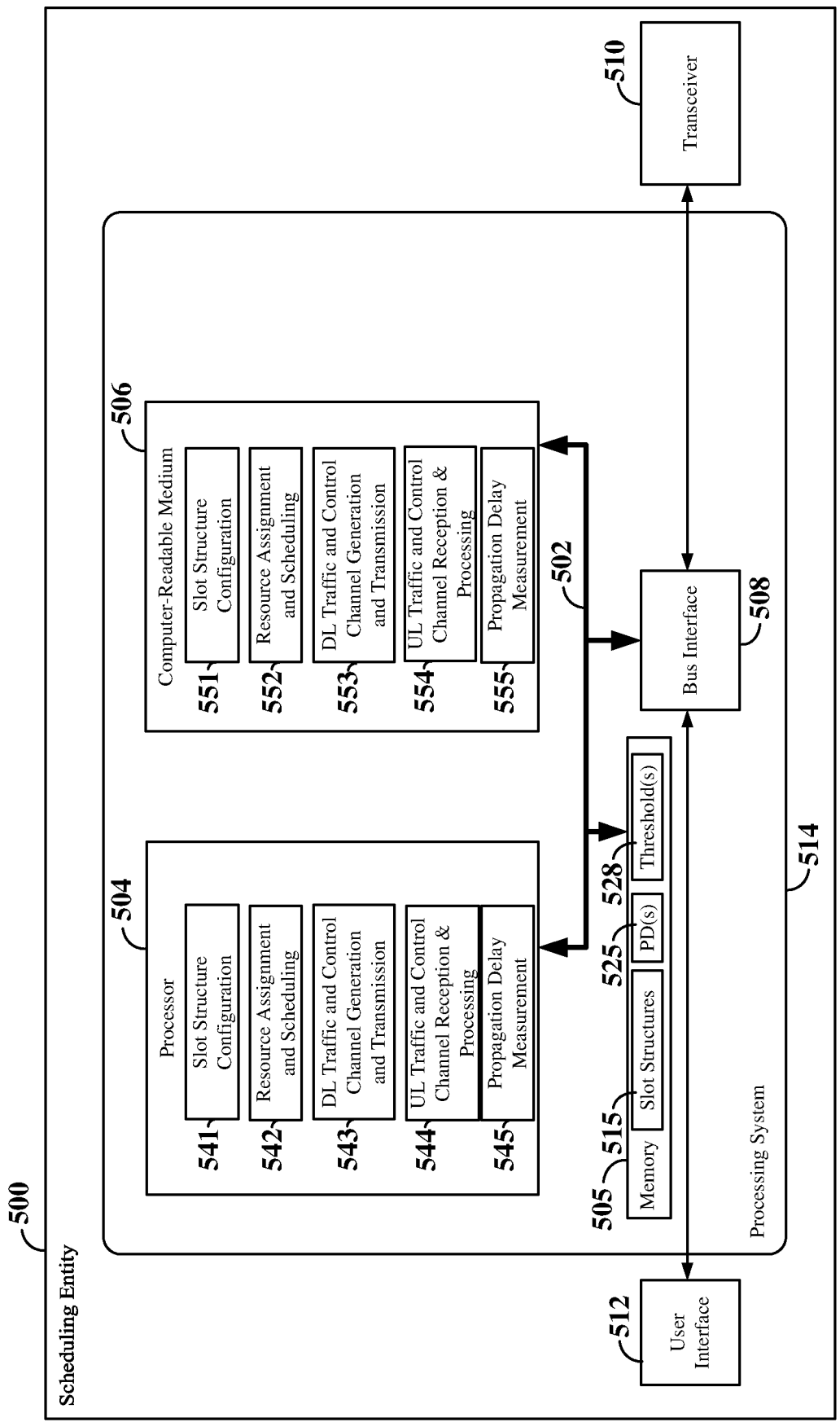
FIG. 5 is a block diagram illustrating an example of a hardware implementation for a scheduling entity employing a processing system according to some aspects of the present disclosure.

FIG. 5 is a simplified block diagram illustrating an example of a hardware implementation for a scheduling entity 500 employing a processing system 514. For example, the scheduling entity 500 may be a base station as illustrated in FIGS. 1 and/or 2. In another example, the scheduling entity 500 may be a user equipment as illustrated in FIGS. 1 and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes described below.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the present disclosure, the processor 504 may include circuitry configured for various functions. For example, the processor 504 may include slot structure configuration circuitry 541, configured to configure UE-specific slot structures 515 for UEs (scheduled entities) within the cell served by the scheduling entity 500. In some examples, the slot structure configuration circuitry 541 may configure a respective DL-centric slot structure and/or an UL-centric slot structure for each UE based on the respective propagation delays (PDs) 525 experienced by the UEs in the cell.

In an aspect of the present disclosure, the slot structure configuration circuitry 541 may configure the uplink transmission duration of a slot structure 515 (e.g., a DL-centric slot structure and/or an UL-centric slot structure) for a particular UE based on the propagation delay 525 between the scheduling entity 500 and that particular UE. In some examples, the slot structure configuration circuitry 541 may configure the number of symbols in the uplink burst of a DL-centric slot structure and/or an UL-centric slot structure based on the propagation delay 525. In this example, UEs with larger propagation delays 525, and therefore larger timing advances (TAs), may be configured with fewer numbers of symbols in the uplink burst than UEs with smaller propagation delays 525.

In some examples, the slot structure configuration circuitry 541 may compare the propagation delay 525 for each UE with a threshold 528, which may be maintained, for example, in memory 505, and configure the number of symbols in the uplink burst for that UE based on the result of the comparison. In general, UEs with propagation delays 525 less than the threshold 528 may be configured with more symbols for the uplink burst than UEs with propagation delays 525 greater than the threshold 528. For example, UEs with small propagation delays 525 (e.g., propagation delays less than the threshold 528), such as cell-center UEs or UEs in small cells, may be configured with a slot structure 515 (UL-centric and/or DL-centric) that includes two symbols for the uplink burst. In addition, UEs with large propagation delays 525 (e.g., propagation delays greater than the threshold 528), such as cell-edge UEs or UEs in macrocells, may be configured with a slot structure 515 (UL-centric and/or DL-centric) that includes a single symbol for the uplink burst. In other examples, the slot structure configuration circuitry 541 may configure the number of symbols in the uplink burst for a UE based on a sliding scale of propagation delays 525, with lower propagation delay UEs being configured with more uplink burst symbols than higher propagation delay UEs.

The slot structure configuration circuitry 541 may further configure each DL-centric slot structure for each UE to include a cell-specific downlink transmission duration (e.g., number of symbols for the DL burst and the DL traffic portion) selected to avoid interference between downlink transmissions and uplink transmissions within the cell based on the different propagation delays 525 present in the cell. For example, the slot structure configuration circuitry 541 may be configured to configure the downlink transmission duration to ensure there is a guard period between reception of downlink transmissions and initiation of uplink transmissions at cell-edge UEs or UEs in macrocells. In addition, the slot structure configuration circuitry 541 may be configured to configure the downlink transmission duration to ensure that the scheduling entity 500 receives the uplink burst from cell-edge UEs or UEs within macrocells within the DL-centric slot duration. In some examples, the slot structure configuration circuitry 541 may configure the cell-specific downlink transmission duration of each DL-centric slot structure based on the maximum propagation delay 525 experienced by the UEs in the cell. For example, the slot structure configuration circuitry 541 can set the duration of the downlink transmission to ensure that the UE with the maximum propagation delay 525 receives the downlink transmission with sufficient time for a guard period before that UE initiates the uplink burst.

The slot structure configuration circuitry 541 may further individually configure the uplink transmission duration of both the uplink burst and the uplink traffic portion of a respective UL-centric slot structure for each UE based on the respective propagation delay 525 experienced by that UE. In some examples, the slot structure configuration circuitry 541 may configure the number of symbols in not only the uplink burst, but also the uplink traffic portion, of an UL-centric slot structure for a UE based on the propagation delay 525. In some examples, the slot structure configuration circuitry 541 may compare the propagation delay 525 for each UE with a threshold 528 and configure the number of symbols in the uplink burst and uplink traffic portion in the UL-centric slot structure for that UE based on the result of the comparison. In general, UEs with propagation delays 525 less than the threshold 528 may be configured with more symbols for the uplink burst and uplink traffic portion than UEs with propagation delays 525 greater than the threshold 528. In other examples, the slot structure configuration circuitry 541 may configure the number of symbols in the uplink traffic portion and uplink burst for a UE based on a sliding scale of propagation delays 525, with lower propagation delay UEs being configured with more uplink symbols than higher propagation delay UEs. In general, the number of uplink symbols configured for a particular UE may be any number of symbols up to a maximum number of symbols that may both be transmitted by a UE and received by the scheduling entity 500 within the UL-centric slot duration.

For example, the slot structure configuration circuitry 541 may configure the UL-centric slot structures for cell-center UEs to include additional PUSCH and/or PUCCH symbols in the uplink traffic portion and/or uplink burst. In addition, the slot structure configuration circuitry 541 may configure the UL-centric slot structures for cell-edge UEs to include fewer PUSCH and/or PUCCH symbols in the uplink traffic portion and/or uplink burst to ensure all uplink transmissions are received from cell-edge UEs within the UL-centric slot duration.

In addition, the slot structure configuration circuitry 541 may configure each UL-centric slot structure for each UE to include a cell-specific downlink burst duration (e.g., the number of symbols in the downlink burst may be fixed in the cell). However, the slot structure configuration circuitry 541 may configure the downlink burst within UL-centric slot structures of cell-edge UEs to include downlink control information (DCI) within only the first symbol of the downlink burst to ensure cell-edge UEs receive their DCI prior to initiation of uplink transmissions by cell-center UEs.

In some examples, the slot structure configuration circuitry 541 may pre-configure two or more UL-centric slot structures and two or more DL-centric slot structures and maintain the slot structures 515 within, for example, memory 505. The slot structure configuration circuitry 541 may then assign one of the UL-centric slot structures and one of the DL-centric slot structures to each UE based on the propagation delay 525 experienced by that UE. In this example, the slot structure configuration circuitry may utilize the maximum possible propagation delay to configure the downlink transmission duration. In other examples, the slot structure configuration circuitry 541 may dynamically configure the slot structures 515 for each UE based on the propagation delays 525 experienced by the UEs in the cell.

The slot structure configuration circuitry 541 may further update the slot structures configured for each UE with changes in the propagation delays 525 experienced by the UEs. For example, the slot structure configuration circuitry 541 may update the slot structure (DL-centric and/or UL-centric) for a particular UE when the propagation delay 525 changes by more than a threshold 528 (e.g., the difference between a current propagation delay and a previous propagation delay exceeds a threshold). In other examples, the slot structure configuration circuitry 541 may periodically or aperiodically update the slot structure configuration for one or more UEs. The slot structure configuration circuitry 541 may further be configured to operate in coordination with slot structure configuration software 551.

The processor 504 may further include resource assignment and scheduling circuitry 542, configured to generate, schedule, and modify a resource assignment or grant of time-frequency resources (e.g., a set of one or more resource elements). For example, the resource assignment and scheduling circuitry 542 may schedule time-frequency resources within a plurality of time division duplex (TDD) and/or frequency division duplex (FDD) subframes or slots to carry user data traffic and/or control information to and/or from multiple UEs (scheduled entities). In various aspects of the present disclosure, the resource assignment and scheduling circuitry 542 may be configured to schedule time-frequency resources for UEs based on the UE-specific slot structures 515 configured by the slot structure configuration circuitry 541.

In some examples, the resource assignment and scheduling circuitry 542 may be configured to schedule time-frequency resources for UEs within a downlink transmission duration (e.g., the duration of a downlink burst and a DL traffic portion) of a DL-centric slot. The downlink transmission duration may be cell-specific and provided by the slot structure configuration circuitry 541. For example, as described above, the slot structure configuration circuitry 541 may calculate the downlink transmission duration (e.g., the number of symbols utilized for downlink transmissions within the DL-centric slot) utilizing, for example, the maximum propagation delay in the cell (e.g., the maximum possible propagation delay in the cell or the maximum actual propagation delay experienced by a UE in the cell).

The resource assignment and scheduling circuitry 542 may further schedule time-frequency resources for uplink bursts within a DL-centric slot based on the DL-centric slot structures for each UE having control information to transmit in the uplink burst. For example, the number and position of symbols within the DL-centric slot scheduled for a particular UE to transmit an uplink burst may be determined by the DL-centric slot structure for that particular UE.

The resource assignment and scheduling circuitry 542 may further schedule time-frequency resources for PDCCH's within a downlink burst of an UL-centric slot based on the UL-centric slot structures for each UE receiving a PDCCH within the UL-centric slot. For example, the resource assignment and scheduling circuitry 542 may schedule the PDCCH of a cell-edge UE within the first symbol of the downlink burst of the UL-centric slot based on the UL-centric slot structure for that cell-edge UE.

The resource assignment and scheduling circuitry 542 may further schedule time-frequency resources for uplink transmissions (PDSCH and/or PUCCH) within an uplink traffic portion and/or an uplink burst of an UL-centric slot for UEs having user data traffic or control information to transmit to the scheduling entity 500 based on the UL-centric slot structures of the UEs. For example, the number and position of uplink symbols scheduled for a particular UE within the UL-centric slot may be determined by the UL-centric slot structure for that particular UE. The resource assignment and scheduling circuitry 542 may further operate in coordination with resource assignment and scheduling software 552.

The processor 504 may further include downlink (DL) traffic and control channel generation and transmission circuitry 543, configured to generate and transmit downlink user data traffic and control signals/channels. For example, the DL traffic and control channel generation and transmission circuitry 543 may be configured to generate master information blocks (MIBs), master or other system information blocks (SIBs), and/or radio resource control (RRC) connection or configuration messages, and various channels, such as the PBCH (which may carry the MIB and/or SIB), PSS, SSS, and/or physical hybrid automatic repeat request (HARQ) indicator channel (PHICH).

The DL traffic and control channel generation and transmission circuitry 543 may further be configured to generate a physical downlink shared channel (PDSCH) including downlink user data traffic. In addition, the DL traffic and control channel generation and transmission circuitry 543 may operate in coordination with the resource assignment and scheduling circuitry 542 to schedule the DL user data traffic and/or control information and to place the DL user data traffic and/or control information onto a time division duplex (TDD) or frequency division duplex (FDD) carrier within one or more subframes or slots in accordance with the resources assigned to the DL user data traffic and/or control information. The DL traffic and control channel generation and transmission circuitry 543 may further be configured to multiplex DL transmissions utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The DL traffic and control channel generation and transmission circuitry 543 may further be configured to generate a physical downlink control channel (PDCCH) including downlink control information (DCI). In some examples, the DCI may include control information indicating an assignment of downlink resources for downlink user data traffic or a grant of uplink or sidelink resources for one or more scheduled entities.

In various aspects of the present disclosure, the DL traffic and control channel generation and transmission circuitry 543 may further be configured to generate slot structure configuration information indicating the slot structure (DL-centric and/or UL-centric) configured by the slot structure configuration circuitry 541 for a particular UE, and to transmit the slot structure configuration information to the particular UE via the transceiver 510. In some examples, the slot structure configuration information may be signaled semi-statically via RRC messages or dynamically via the PDCCH. The DL traffic and control channel generation and transmission circuitry 543 may further operate in coordination with DL data and control channel generation and transmission software 553.

The processor 504 may further include uplink (UL) traffic and control channel reception and processing circuitry 544, configured to receive and process uplink control channels and uplink traffic channels from one or more scheduled entities. For example, the UL traffic and control channel reception and processing circuitry 544 may be configured to receive a scheduling request from a scheduled entity. The UL traffic and control channel reception and processing circuitry 544 may further be configured to provide the scheduling request to the resource assignment and scheduling circuitry 542 for processing. The UL traffic and control channel reception and processing circuitry 544 may further be configured to receive uplink user data traffic from one or more scheduled entities. In general, the UL traffic and control channel reception and processing circuitry 544 may operate in coordination with the resource assignment and scheduling circuitry 542 to schedule UL traffic transmissions, DL traffic transmissions and/or DL traffic retransmissions in accordance with the received UL control information.

In addition, in various aspects of the present disclosure, the UL traffic and control channel reception and processing circuitry 544 may further be configured to receive a propagation delay 525 measured by a UE from that UE. The propagation delay 525 may be measured by the UE periodically or aperiodically and may be included in a report that is sent from the UE periodically or aperiodically. In some examples, the report is received from the UE in response to a request transmitted to the UE. For example, the DL traffic and control channel generation and transmission circuitry 543 may poll the UEs in the cell to send propagation delay reports to the scheduling entity 500. Such a poll may be generated and transmitted periodically or aperiodically. The UL traffic and control channel reception and processing circuitry 544 may further be configured to store the received propagation delay 525 within memory 505 and to provide the received propagation delay 525 from a particular UE to the slot structure configuration circuitry 541 to update the slot structure(s) of that particular UE, if necessary. The UL traffic and control channel reception and processing circuitry 544 may further operate in coordination with UL traffic and control channel reception and processing software 554.

The processor 504 may further include propagation delay measurement circuitry 545, configured to measure the respective propagation delay 525 between the scheduling entity 500 and each UE within the cell served by the scheduling entity 500 and to store the measured propagation delay 525 within memory 505. For example, the propagation delay measurement circuitry 545 may measure an initial propagation delay 525 for a particular UE based on a random access channel (RACH) transmission from that particular UE. Subsequent propagation delays 525 may then be measured periodically or aperiodically by the propagation delay measurement circuitry 545 utilizing any uplink transmission from the UE. The propagation delay measurement circuitry 545 may further be configured to provide the respective measured propagation delay 525 for one or more UEs to the slot structure configuration circuitry 541 to initially configure or update the slot structure(s) of the one or more UEs. The propagation delay measurement circuitry 545 may further operate in coordination with propagation delay measurement software 555.

Figure 6:
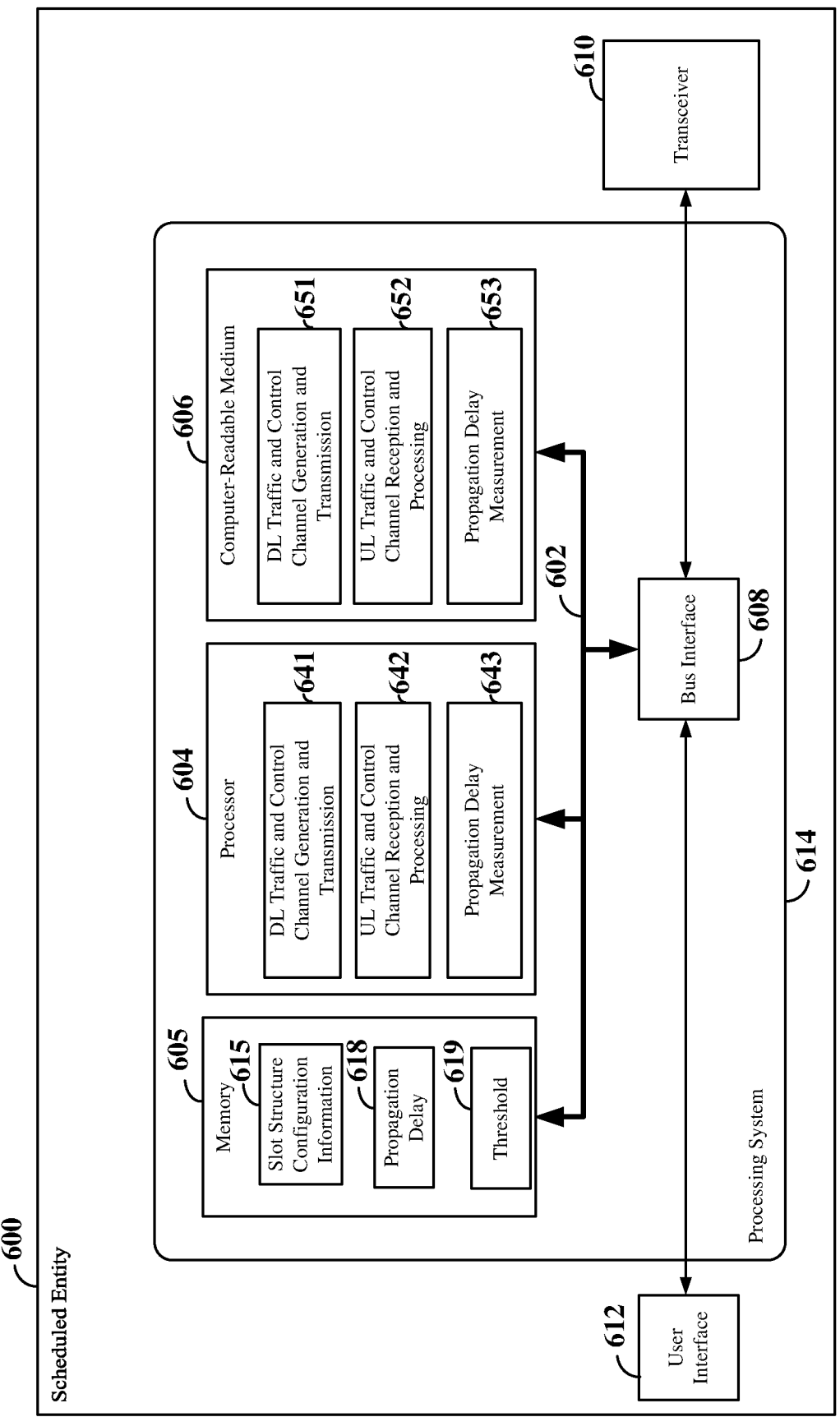
FIG. 6 is a block diagram illustrating an example of a hardware implementation for a scheduled entity employing a processing system according to some aspects of the present disclosure.

FIG. 6 is a conceptual diagram illustrating an example of a hardware implementation for an exemplary scheduled entity 600 employing a processing system 614. In accordance with various aspects of the present disclosure, an element, or any portion of an element, or any combination of elements may be implemented with a processing system 614 that includes one or more processors 604. For example, the scheduled entity 600 may be a user equipment (UE) as illustrated in any one or more of FIGS. 1 and 2.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below.

In some aspects of the present disclosure, the processor 604 may include downlink (DL) traffic and control channel reception and processing circuitry 641, configured for receiving and processing downlink user data traffic on a downlink traffic channel (e.g., PDSCH) of a DL-centric slot, and to receive and process control information on one or more downlink control channels (e.g., PDCCHs) of a DL-centric slot or an UL-centric slot.

In various aspects of the present disclosure, the DL traffic and control channel reception and processing circuitry 641 may further be configured to receive slot structure configuration information 615 (e.g., within an RRC message or PDCCH) indicating the DL-centric slot structure and/or UL-centric slot structure configured for the scheduled entity 600 based on the propagation delay between the scheduled entity 600 and scheduling entity (e.g., base station). For example, the slot structure configuration information 615 may indicate an uplink transmission duration for a particular slot structure (DL-centric or UL-centric). The slot structure configuration information 615 may further indicate a downlink transmission duration for a DL-centric slot structure. In addition, the slot structure configuration information 615 may indicate the number and/or position of symbols within a downlink burst of an UL-centric slot that may include a PDCCH for the UE. The slot structure configuration information 615 may be stored, for example, in memory 605. The DL traffic and control channel reception and processing circuitry 641 may operate in coordination with DL traffic and control channel reception and processing software 651.

The processor 604 may include uplink (UL) traffic and control channel generation and transmission circuitry 642, configured to generate and transmit uplink control/feedback/acknowledgement information on an UL control channel. For example, the UL traffic and control channel generation and transmission circuitry 642 may be configured to generate and transmit an uplink control channel (e.g., a Physical Uplink Control Channel (PUCCH)) within an uplink burst of a DL-centric slot or UL-centric slot or within an uplink traffic portion of an UL-centric slot in accordance with an uplink grant and/or based on the slot structure configuration information 615. The UL traffic and control channel generation and transmission circuitry 642 may further be configured to generate and transmit uplink user data traffic on an UL traffic channel (e.g., a PUSCH) within an uplink traffic portion of an UL-centric slot in accordance with an uplink grant based on the slot structure configuration information 615. The UL traffic and control channel generation and transmission circuitry 642 may operate in coordination with UL traffic and control channel generation and transmission software 652.

The processor 604 may further include propagation delay measurement circuitry 643, configured to measure the propagation delay 618 between the scheduled entity and the scheduling entity, which may be one of the propagation delays 525 shown in FIG. 5. The propagation delay measurement circuitry 643 may measure the propagation delay 618 utilizing any downlink channel or signal. In some examples, the propagation delay measurement circuitry 643 may measure the propagation delay 618 based on the start of a DL PDCCH for the scheduled entity. The propagation delay measurement circuitry 643 may measure the propagation delay 618 periodically or aperiodically. In some examples, the propagation delay measurement circuitry 643 may measure the propagation delay 618 in response to a request (e.g., polling) by the scheduling entity. For example, the DL traffic and control channel reception and processing circuitry 641 may receive the request/poll from the scheduling entity and instruct the propagation delay measurement circuitry 643 to measure the propagation delay 618 in response to the request/poll.

The propagation delay measurement circuitry 643 may further provide the measured propagation delay 618 to the UL traffic and control channel generation and transmission circuitry 642 to report the measured propagation delay 618 to the scheduling entity. In some examples, the propagation delay report may be generated periodically (e.g., using the latest measured propagation delay) or aperiodically. For example, the propagation delay report may be generated and transmitted in response to a request/poll from the scheduling entity. In other examples, the propagation delay report may be triggered based on certain conditions, such as a large change in the measured propagation delay 618. For example, the propagation delay measurement circuitry 643 may calculate the difference between the current measured propagation delay and a previous measured propagation delay. If the difference exceeds a threshold 619, which may be stored, for example, in memory 605, the propagation delay measurement circuitry 643 may provide the current measured propagation delay (or calculated propagation delay difference) to the UL traffic and control channel generation and transmission circuitry 642 for generation and transmission of a propagation delay report including the current measured propagation delay (or the calculated propagation delay difference). The propagation delay measurement circuitry 643 may further store the current propagation delay measurement and optionally one or more previous propagation delay measurements 618 within, for example, memory 605. The propagation delay measurement circuitry 643 may operate in coordination with propagation delay measurement software 653.

Figure 7:
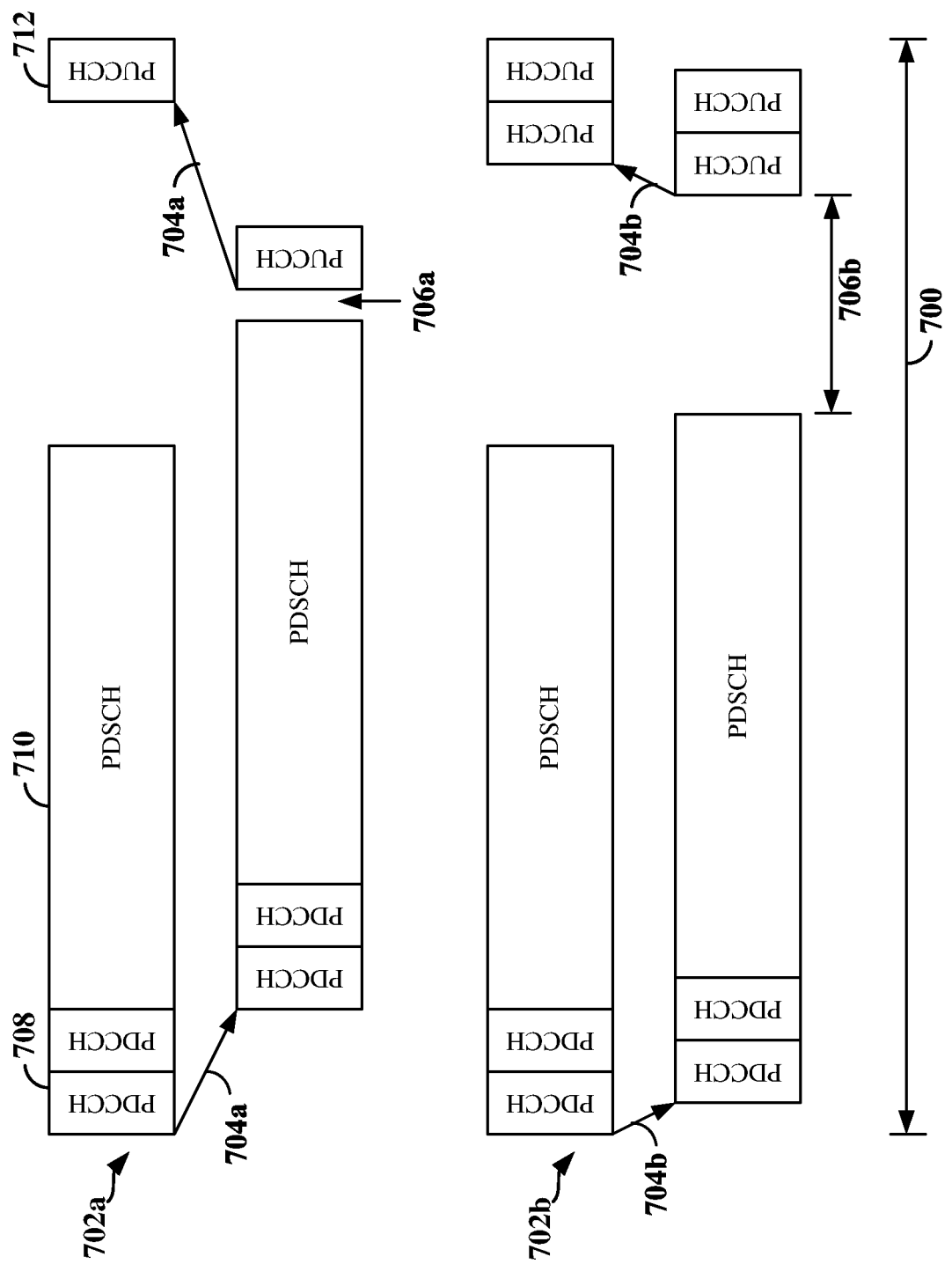
FIG. 7 is a diagram illustrating examples of UE-specific configurable DL-centric slot structures according to some aspects of the present disclosure.

FIG. 7 is a diagram illustrating examples of UE-specific configurable DL-centric slot structures 702*a* and 702*b* according to some aspects of the present disclosure. Each of the DL-centric slot structures 702*a* and 702*b* is configured such that all transmissions and receptions occur within the duration of a DL-centric slot 700. DL-centric slot structure 702*a* represents an exemplary DL-centric slot structure for a cell-edge UE with a long propagation delay 704*a*. DL-centric slot structure 702*b* represents an exemplary DL-centric slot structure for a cell-center UE with a short propagation delay 704*b*.

As shown in FIG. 7, the downlink transmission duration (e.g., duration of the PDCCH 708 in combination with the PDSCH 710) for each of the DL-centric slot structures 702*a* and 702*b* is cell-specific. Thus, the number of PDCCH symbols (e.g., two symbols in FIG. 7) and the number of PDSCH symbols are selected to avoid interference between downlink transmissions and uplink transmissions within the cell based on the different propagation delays 704*a* and 704*b* present in the cell. In the example shown in FIG. 7, the downlink transmission duration is selected to ensure there is a guard period 706*a* between reception of the PDSCH 710 and initiation of uplink transmissions (e.g., PUCCH 712) in the DL-centric slots structure 702*a* of the cell-edge UE. In addition, the downlink transmission duration is further selected to ensure that the PUCCH 712 may be received by the base station (e.g., eNB or gNB) within the duration of the DL-centric slot 700.

Since the cell-center UE may receive the downlink transmissions prior to the cell-edge UE (as a result of the shorter propagation delay 704*b*), the DL-centric slot structure 702*b* of the cell-center UE may effectively include a larger guard period 706*b* than the cell-edge UE. This larger guard period 706*b* may be realized by configuring the DL-centric slot structure 702*b* of the cell-center UE to ensure the PUCCH 712 is scheduled after completion of reception of the PDSCH 710 by the cell-edge UE. For example, the first PUCCH symbol in the DL-centric slot 700 is scheduled after reception of the last PDSCH symbol by the cell-edge UE.

Each DL-centric slot structure 702*a* and 702*b* may further include a different uplink transmission duration (e.g., different number of symbols of the PUCCH 712) based on the respective propagation delays 704*a* and 704*b*. In the example shown in FIG. 7, the DL-centric slot structure 702*a* of the cell-edge UE includes only one PUCCH symbol due to the larger propagation delay 704*a*, and therefore, larger timing advance (TA) needed for the cell-edge UE. On the other hand, the DL-centric slot structure 702*b* of the cell-center UE includes two PUCCH symbols, since there is sufficient time within the duration of the DL-centric slot 700 for the cell-center UE to transmit more than one PUCCH symbol and have those PUCCH symbols received within the DL-centric slot duration.

Figure 8:
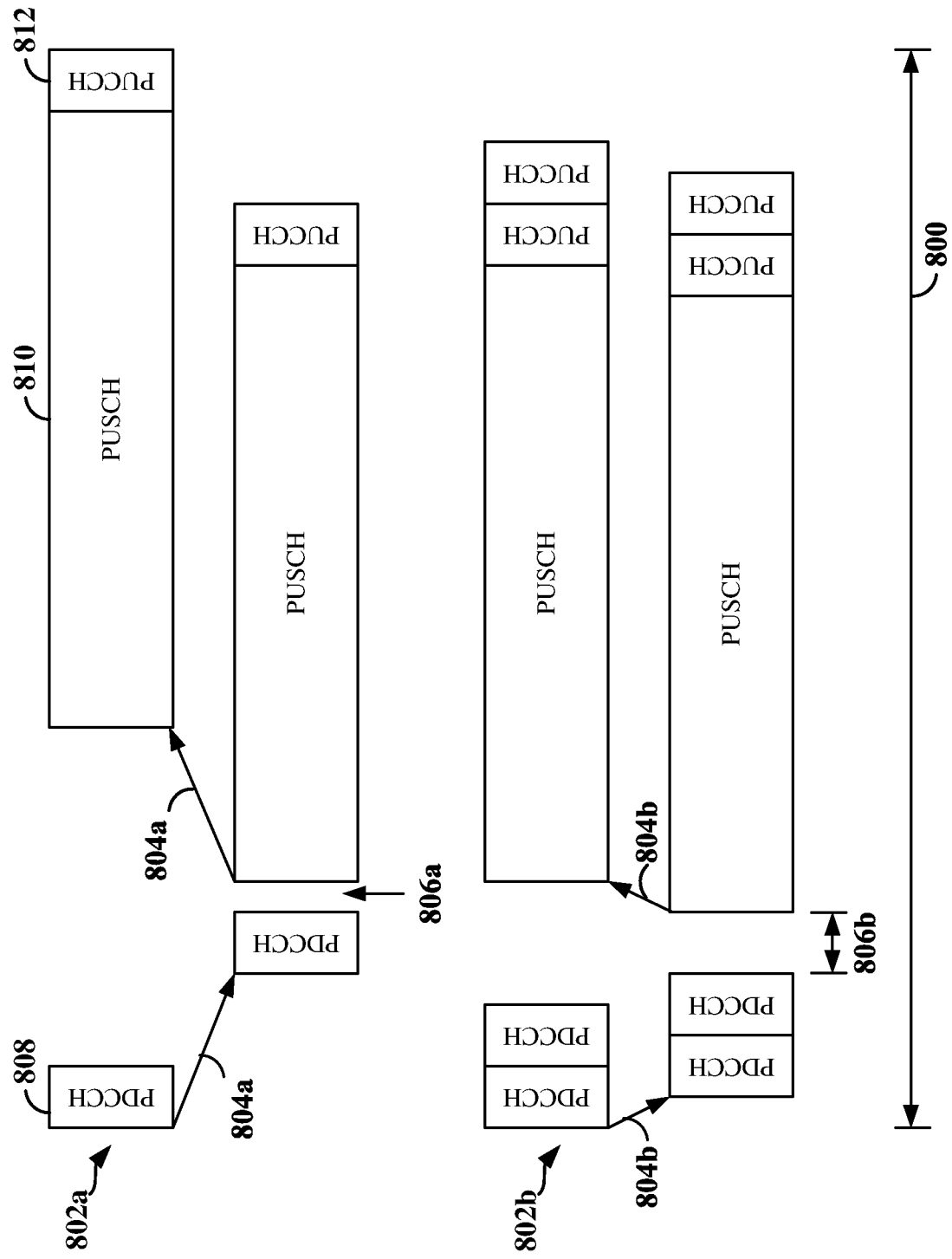
FIG. 8 is a diagram illustrating examples of UE-specific configurable UL-centric slot structures according to some aspects of the present disclosure.

FIG. 8 is a diagram illustrating examples of UE-specific configurable UL-centric slot structures 802*a* and 802*b* according to some aspects of the present disclosure. Each of the UL-centric slot structures 802a and 802b is configured such that all transmissions and receptions occur within the duration of an UL-centric slot 800. UL-centric slot structure 802a represents an exemplary UL-centric slot structure for a cell-edge UE with a long propagation delay 804a. UL-centric slot structure 802b represents an exemplary UL-centric slot structure for a cell-center UE with a short propagation delay 804b.

As in FIG. 7, the downlink transmission duration (e.g., duration of the PDCCH 808) for each of the UL-centric slot structures 802a and 802b is cell-specific. However, as shown in FIG. 8, the PDCCH 808 within the UL-centric slot structure 802a of the cell-edge UE may be configured to include downlink control information (DCI) within only the first symbol of the PDCCH 808 to ensure the cell-edge UE receive their DCI prior to initiation of uplink transmissions (e.g., PUSCH 810) by the cell-center UE. Thus, even though the PDCCH 808 in FIG. 8 includes two symbols for both of the UL-centric slot structures 802a and 802b, only the first PDCCH symbol is illustrated in the DL-centric slot structure 802 of the cell-edge UE. Although there may be overlap between the time the second PDCCH symbol arrives at the cell-edge UE and the time the cell-edge UE and/or cell-center UE initiates transmission of the PUSCH 810, since the second PDCCH symbol does not include any DCI for the cell-edge UE, the cell-edge UE does not need to receive or process the second PDCCH symbol. Therefore, any overlapping uplink transmissions do not interfere with the PDCCH reception at the cell-edge UE.

As further shown in FIG. 8, the UL-centric slot structure 802a of the cell-edge UE is configured to ensure there is a guard period 806a between reception of the first PDCCH symbol and initiation of transmission of the PUSCH 810. The guard period 806a may be realized by configuring the UL-centric slot structure 802a of the cell-edge UE to ensure the PUSCH 810 is scheduled after the guard period 806a (e.g., the position of the first scheduled PUSCH symbol within the UL-centric slot 800 is after the guard period 806a). In addition, since the cell-center UE may receive the downlink transmissions prior to the cell-edge UE (as a result of the shorter propagation delay 704b), the UL-centric slot structure 802b of the cell-center UE may effectively include a larger guard period 806b than the cell-edge UE. This larger guard period 806b may be realized by configuring the UL-centric slot structure 802b of the cell-center UE to ensure the PUSCH 810 is scheduled after completion of reception of the PDCCH 808 by the cell-edge UE.

Each UL-centric slot structure 802a and 802b may further include a different uplink transmission duration (e.g., different number of symbols of the PUSCH 810 and PUCCH 812) based on the respective propagation delays 804a and 804b. In the example shown in FIG. 8, the UL-centric slot structure 802a of the cell-edge UE includes fewer PUSCH and PUCCH symbols (e.g., fewer PUSCH symbols and only one PUCCH symbol) due to the larger propagation delay 804a, and therefore, larger timing advance (TA) needed for the cell-edge UE. On the other hand, the UL-centric slot structure 802b of the cell-center UE includes more PUSCH and PUCCH symbols (e.g., additional PUSCH symbols and two PUCCH symbols), since there is sufficient time within the duration of the UL-centric slot 800 for the cell-center UE to transmit more PUSCH and PUCCH symbols and have those PUSCH and PUCCH symbols received within the UL-centric slot duration.

Figure 9:
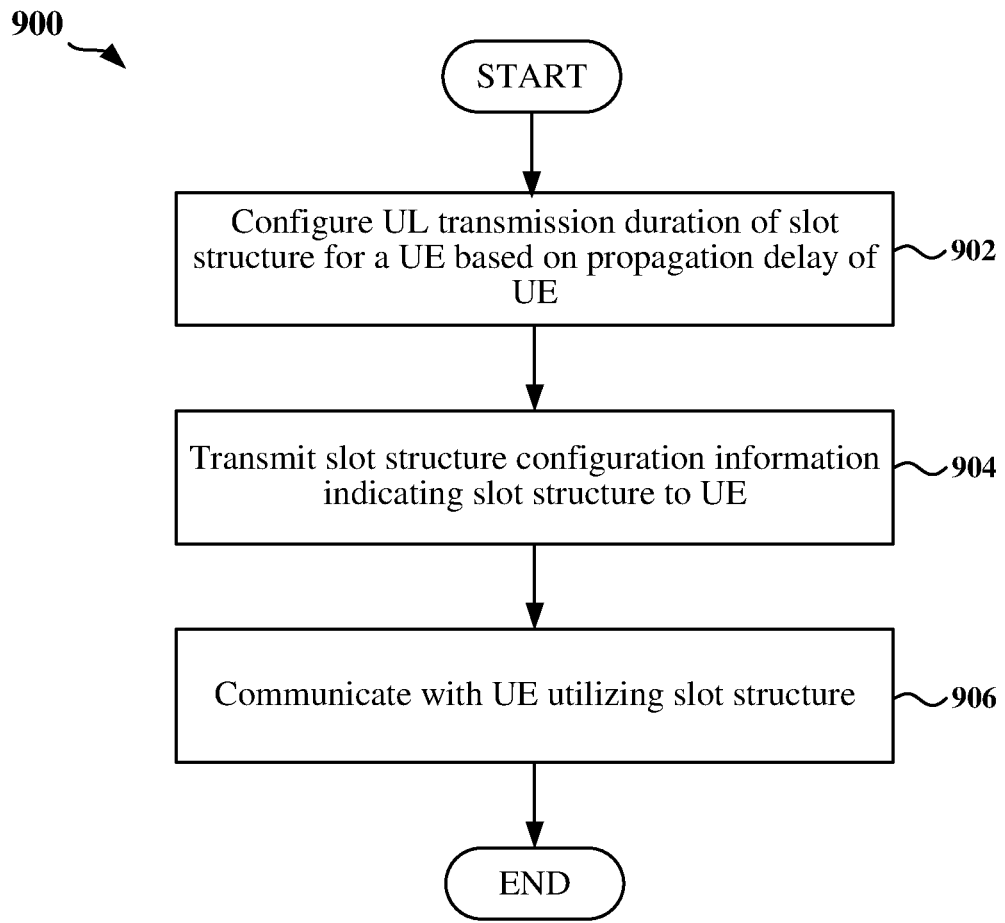
FIG. 9 is a flow chart illustrating an exemplary process for wireless communication with UE-specific slot structures according to some aspects of the present disclosure.

FIG. 9 is a flow chart illustrating an exemplary process 900 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 900 may be carried out by the scheduling entity (e.g., base station) illustrated in FIG. 5. In some examples, the process 900 may be carried out by any suitable apparatus or means for carrying out the functions or algorithm described below.

At block 902, the base station may configure at least an uplink transmission duration of a slot structure (e.g., DL-centric slot structure and/or UL-centric slot structure) for a particular UE based on the propagation delay between the base station and that particular UE. For example, the slot structure configuration circuitry 541 shown and described above in connection with FIG. 5 may configure the slot structure for a UE based on the propagation delay between the base station and the UE.

At block 904, the base station may generate and transmit slot structure configuration information indicating the slot structure to the UE. For example, the DL traffic and control channel generation and transmission circuitry 543 in combination with the resource assignment and scheduling circuitry 542 and transceiver 510 shown and described above in connection with FIG. 5 may transmit the slot structure configuration information to the UE.

At block 906, the base station may communicate with the UE utilizing the slot structure. In some examples, the base station may utilize the slot structure of the UE when scheduling time-frequency resources for downlink transmissions to the UE and uplink transmissions from the UE within a DL-centric slot or an UL-centric slot. For example, the resource assignment and scheduling circuitry 542 in combination with the DL traffic and control channel generation and transmission circuitry 543, UL traffic and control channel reception and processing circuitry 544, and transceiver 510 shown and described above in connection with FIG. 5 may communicate with the UE utilizing the UE-specific slot structure.

Figure 10:
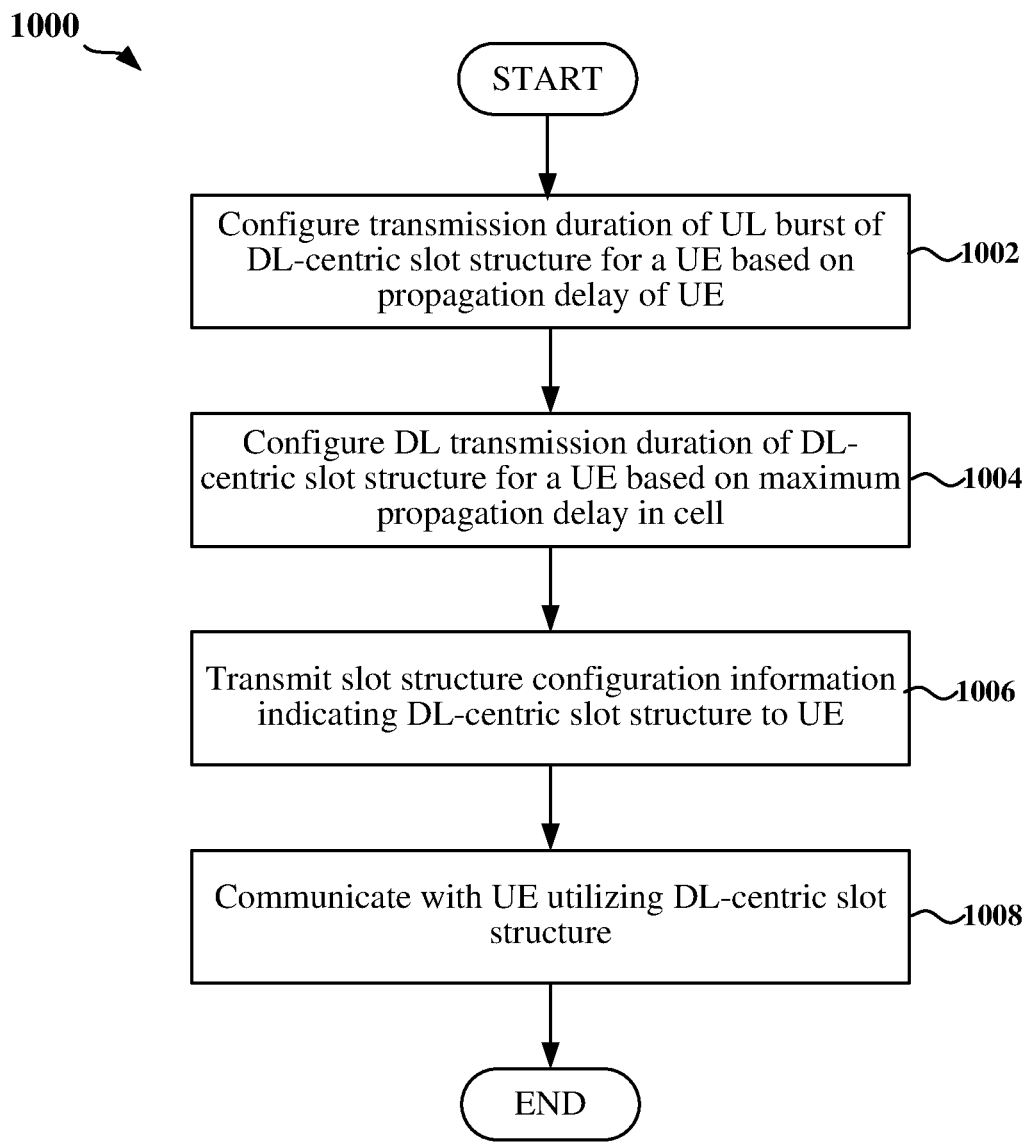
FIG. 10 is a flow chart illustrating another exemplary process for wireless communication with UE-specific slot structures according to some aspects of the present disclosure.

FIG. 10 is a flow chart illustrating another exemplary process 1000 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1000 may be carried out by the scheduling entity (e.g., base station) illustrated in FIG. 5. In some examples, the process 1000 may be carried out by any suitable apparatus or means for carrying out the functions or algorithm described below.

At block 1002, the base station may configure a transmission duration of an UL burst of a DL-centric slot structure for a particular UE based on the propagation delay between the base station and that particular UE. For example, the number of PUCCH symbols (e.g., one or two symbols) may be selected based on the specific propagation delay experienced by the UE. For example, the slot structure configuration circuitry 541 shown and described above in connection with FIG. 5 may configure the transmission duration of the UL burst of a DL-centric slot structure for a UE based on the propagation delay between the base station and the UE.

At block 1004, the base station may configure the DL traffic transmission duration of the DL-centric slot structure based on a maximum propagation delay in the cell served by the base station. For example, the number of PDCCH symbols and the number of PDSCH symbols may be selected to avoid interference between downlink transmissions and uplink transmissions within the cell based on the maximum propagation delay present in the cell. For example, the slot structure configuration circuitry 541 shown and described above in connection with FIG. 5 may configure the DL transmission duration of a DL-centric slot structure for a UE based on the maximum propagation delay present in the cell.

At block 1006, the base station may generate and transmit slot structure configuration information indicating the DL-centric slot structure to the UE. For example, the DL traffic and control channel generation and transmission circuitry 543 in combination with the resource assignment and scheduling circuitry 542 and transceiver 510 shown and described above in connection with FIG. 5 may transmit the slot structure configuration information to the UE.

At block 1008, the base station may communicate with the UE utilizing the DL-centric slot structure. In some examples, the base station may utilize the DL-centric slot structure of the UE when scheduling time-frequency resources for downlink transmissions to the UE and uplink transmissions from the UE within a DL-centric slot. For example, the resource assignment and scheduling circuitry 542 in combination with the DL traffic and control channel generation and transmission circuitry 543, UL traffic and control channel reception and processing circuitry 544, and transceiver 510 shown and described above in connection with FIG. 5 may communicate with the UE utilizing the UE-specific DL-centric slot structure.

Figure 11:
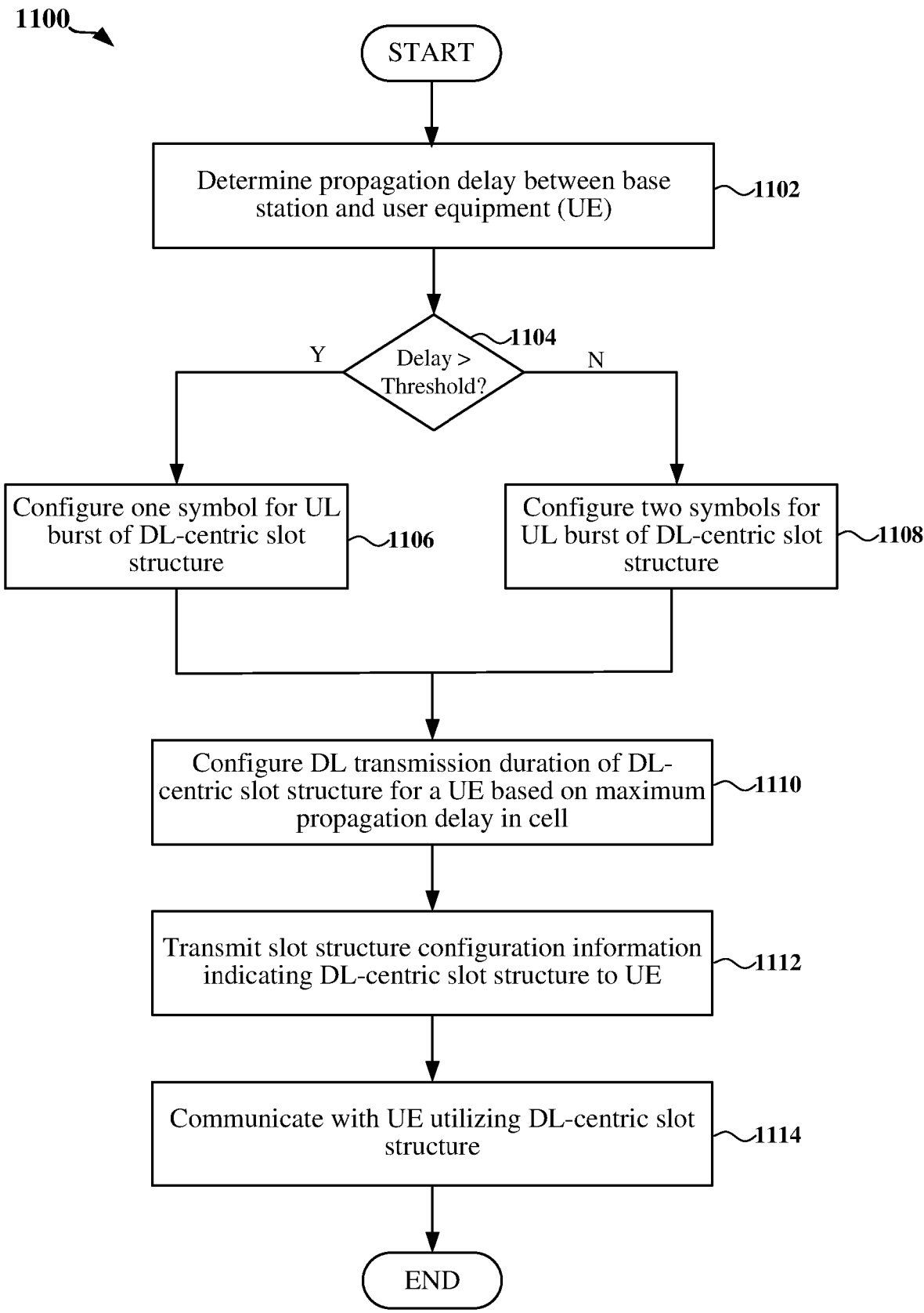
FIG. 11 is a flow chart illustrating another exemplary process for wireless communication with UE-specific slot structures according to some aspects of the present disclosure.

FIG. 11 is a flow chart illustrating another exemplary process 1100 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity (e.g., base station) illustrated in FIG. 5. In some examples, the process 1100 may be carried out by any suitable apparatus or means for carrying out the functions or algorithm described below.

At block 1102, the base station may determine a propagation delay between the base station and a particular UE. In some examples, the base station may receive the propagation delay from the UE or may measure the propagation delay between the base station and the UE. For example, the propagation delay measurement circuitry 545 shown and described above in connection with FIG. 5 may measure the propagation delay and/or the transceiver 510 shown and described above in connection with FIG. 5 may receive the propagation delay from the UE.

At block 1104, the base station may determine whether the propagation delay between the base station and the UE is greater than a threshold. If the propagation delay is greater than the threshold (Y branch of block 1104), at block 1106, the base station may configure a transmission duration of an UL burst of a DL-centric slot structure to include only one symbol. However, if the propagation delay is less than the threshold (N branch of block 1104), at block 1108, the base station may configure the transmission duration of the UL burst of the DL-centric slot structure to include two symbols. For example, the slot structure configuration circuitry 541 shown and described above in connection with FIG. 5 may configure the transmission duration of the UL burst of a DL-centric slot structure for a UE based on the propagation delay between the base station and the UE.

At block 1110, the base station may configure the DL traffic transmission duration of the DL-centric slot structure based on a maximum propagation delay in the cell served by the base station. For example, the number of PDCCH symbols and the number of PDSCH symbols may be selected to avoid interference between downlink transmissions and uplink transmissions within the cell based on the maximum propagation delay present in the cell. For example, the slot structure configuration circuitry 541 shown and described above in connection with FIG. 5 may configure the DL transmission duration of a DL-centric slot structure for a UE based on the maximum propagation delay present in the cell.

At block 1112, the base station may generate and transmit slot structure configuration information indicating the DL-centric slot structure to the UE. For example, the DL traffic and control channel generation and transmission circuitry 543 in combination with the resource assignment and scheduling circuitry 542 and transceiver 510 shown and described above in connection with FIG. 5 may transmit the slot structure configuration information to the UE.

At block 1114, the base station may communicate with the UE utilizing the DL-centric slot structure. In some examples, the base station may utilize the DL-centric slot structure of the UE when scheduling time-frequency resources for downlink transmissions to the UE and uplink transmissions from the UE within a DL-centric slot. For example, the resource assignment and scheduling circuitry 542 in combination with the DL traffic and control channel generation and transmission circuitry 543, UL traffic and control channel reception and processing circuitry 544, and transceiver 510 shown and described above in connection with FIG. 5 may communicate with the UE utilizing the UE-specific DL-centric slot structure.

Figure 12:
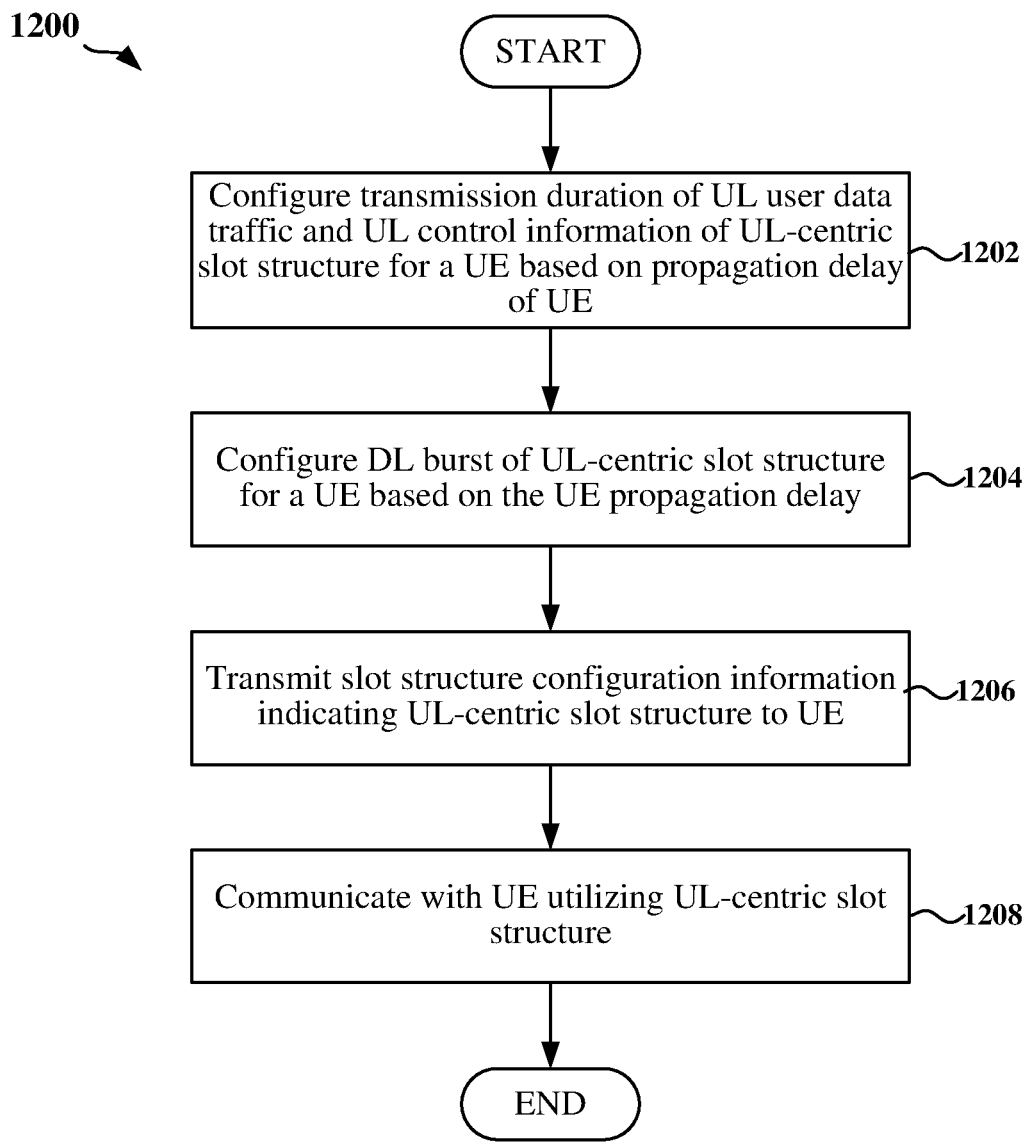
FIG. 12 is a flow chart illustrating another exemplary process for wireless communication with UE-specific slot structures according to some aspects of the present disclosure.

FIG. 12 is a flow chart illustrating another exemplary process 1200 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity (e.g., base station) illustrated in FIG. 5. In some examples, the process 1200 may be carried out by any suitable apparatus or means for carrying out the functions or algorithm described below.

At block 1202, the base station may configure an UL transmission duration of UL user data traffic and UL control information of an UL-centric slot structure for a particular UE based on the propagation delay between the base station and that particular UE. For example, the number of PUSCH and PUCCH symbols may be selected based on the specific propagation delay experienced by the UE. For example, the slot structure configuration circuitry 541 shown and described above in connection with FIG. 5 may configure the UL transmission duration (e.g., the number of PUSCH and PUCCH symbols) of an UL-centric slot structure for a UE based on the propagation delay between the base station and the UE.

At block 1204, the base station may configure a DL burst of the UL-centric slot structure based on the propagation delay experienced by the UE. For example, although the downlink transmission duration (e.g., duration of the PDCCH) may be cell-specific, the base station may configure the DL burst to include downlink control information (DCI) within only the first symbol of the PDCCH or within more than one symbol of the PDCCH based on the propagation delay. For example, the slot structure configuration circuitry 541 shown and described above in connection with FIG. 5 may configure the DL burst of an UL-centric slot structure for a UE based on the UE propagation delay.

At block 1206, the base station may generate and transmit slot structure configuration information indicating the UL-centric slot structure to the UE. For example, the DL traffic and control channel generation and transmission circuitry 543 in combination with the resource assignment and scheduling circuitry 542 and transceiver 510 shown and described above in connection with FIG. 5 may transmit the slot structure configuration information to the UE.

At block 1208, the base station may communicate with the UE utilizing the UL-centric slot structure. In some examples, the base station may utilize the UL-centric slot structure of the UE when scheduling time-frequency resources for downlink transmissions to the UE and uplink transmissions from the UE within an UL-centric slot. For example, the resource assignment and scheduling circuitry 542 in combination with the DL traffic and control channel generation and transmission circuitry 543, UL traffic and control channel reception and processing circuitry 544, and transceiver 510 shown and described above in connection with FIG. 5 may communicate with the UE utilizing the UE-specific UL-centric slot structure.

Figure 13:
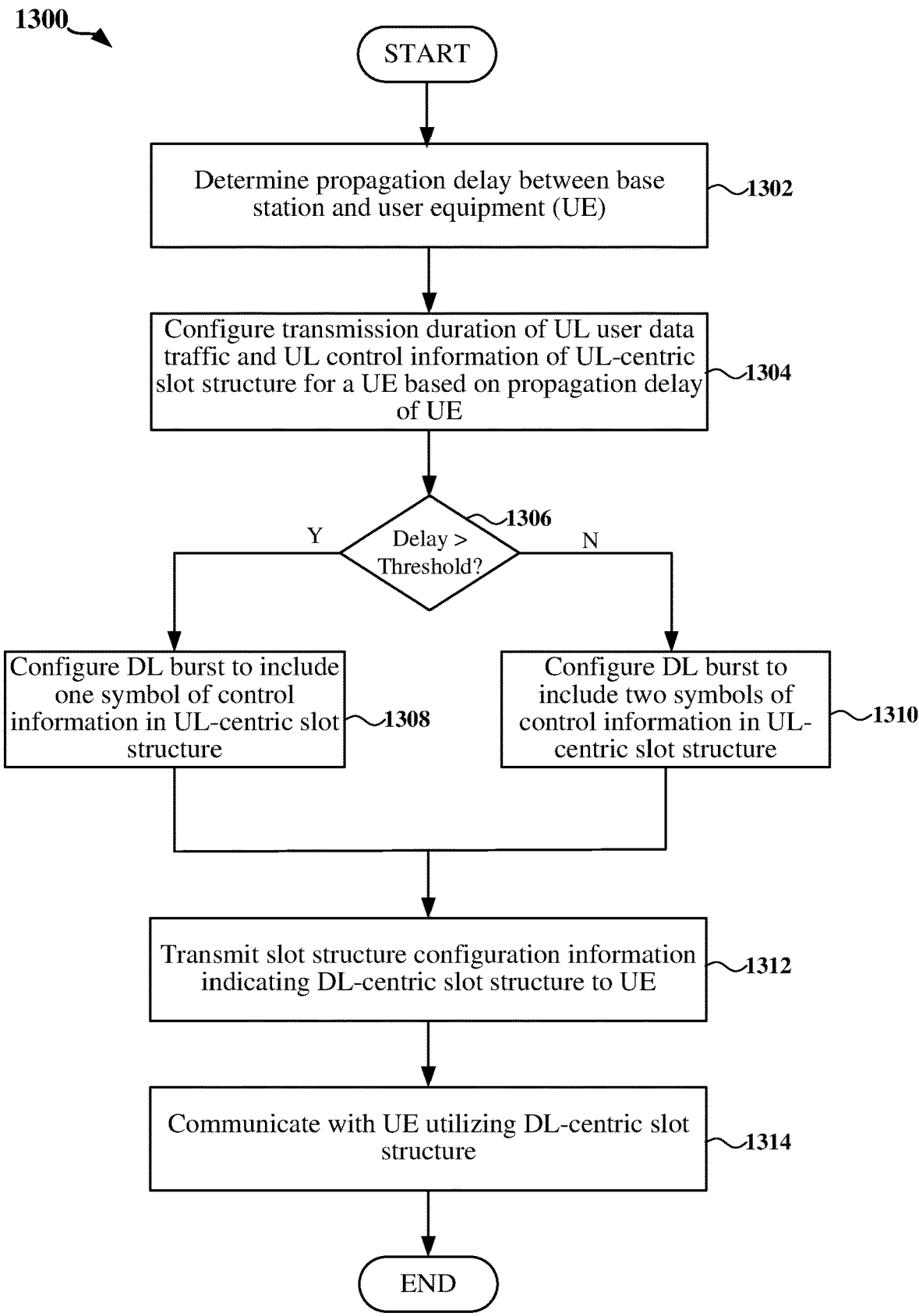
FIG. 13 is a flow chart illustrating another exemplary process for wireless communication with UE-specific slot structures according to some aspects of the present disclosure.

FIG. 13 is a flow chart illustrating another exemplary process 1300 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity (e.g., base station) illustrated in FIG. 5. In some examples, the process 1300 may be carried out by any suitable apparatus or means for carrying out the functions or algorithm described below.

At block 1302, the base station may determine a propagation delay between the base station and a particular UE. In some examples, the base station may receive the propagation delay from the UE or may measure the propagation delay between the base station and the UE. For example, the propagation delay measurement circuitry 545 shown and described above in connection with FIG. 5 may measure the propagation delay and/or the transceiver 510 shown and described above in connection with FIG. 5 may receive the propagation delay from the UE.

At block 1304, the base station may configure an UL transmission duration of UL user data traffic and UL control information of an UL-centric slot structure for a particular UE based on the propagation delay between the base station and that particular UE. For example, the number of PUSCH and PUCCH symbols may be selected based on the specific propagation delay experienced by the UE. For example, the slot structure configuration circuitry 541 shown and described above in connection with FIG. 5 may configure the UL transmission duration (e.g., the number of PUSCH and PUCCH symbols) of an UL-centric slot structure for a UE based on the propagation delay between the base station and the UE.

At block 1306, the base station may determine whether the propagation delay between the base station and the UE is greater than a threshold. If the propagation delay is greater than the threshold (Y branch of block 1306), at block 1308, the base station may configure a DL burst of the UL-centric slot structure to include downlink control information (DCI) within only the first symbol of the PDCCH. However, if the propagation delay is less than the threshold (N branch of block 1306), at block 1310, the base station may configure the DL burst of the UL-centric slot structure to include downlink control information (DCI) within at least two symbols of the PDCCH. For example, the slot structure configuration circuitry 541 shown and described above in connection with FIG. 5 may configure the DL burst of an UL-centric slot structure for a UE based on the UE propagation delay.

At block 1312, the base station may generate and transmit slot structure configuration information indicating the UL-centric slot structure to the UE. For example, the DL traffic and control channel generation and transmission circuitry 543 in combination with the resource assignment and scheduling circuitry 542 and transceiver 510 shown and described above in connection with FIG. 5 may transmit the slot structure configuration information to the UE.

At block 1314, the base station may communicate with the UE utilizing the UL-centric slot structure. In some examples, the base station may utilize the UL-centric slot structure of the UE when scheduling time-frequency resources for downlink transmissions to the UE and uplink transmissions from the UE within an UL-centric slot. For example, the resource assignment and scheduling circuitry 542 in combination with the DL traffic and control channel generation and transmission circuitry 543, UL traffic and control channel reception and processing circuitry 544, and transceiver 510 shown and described above in connection with FIG. 5 may communicate with the UE utilizing the UE-specific UL-centric slot structure.

Figure 14:
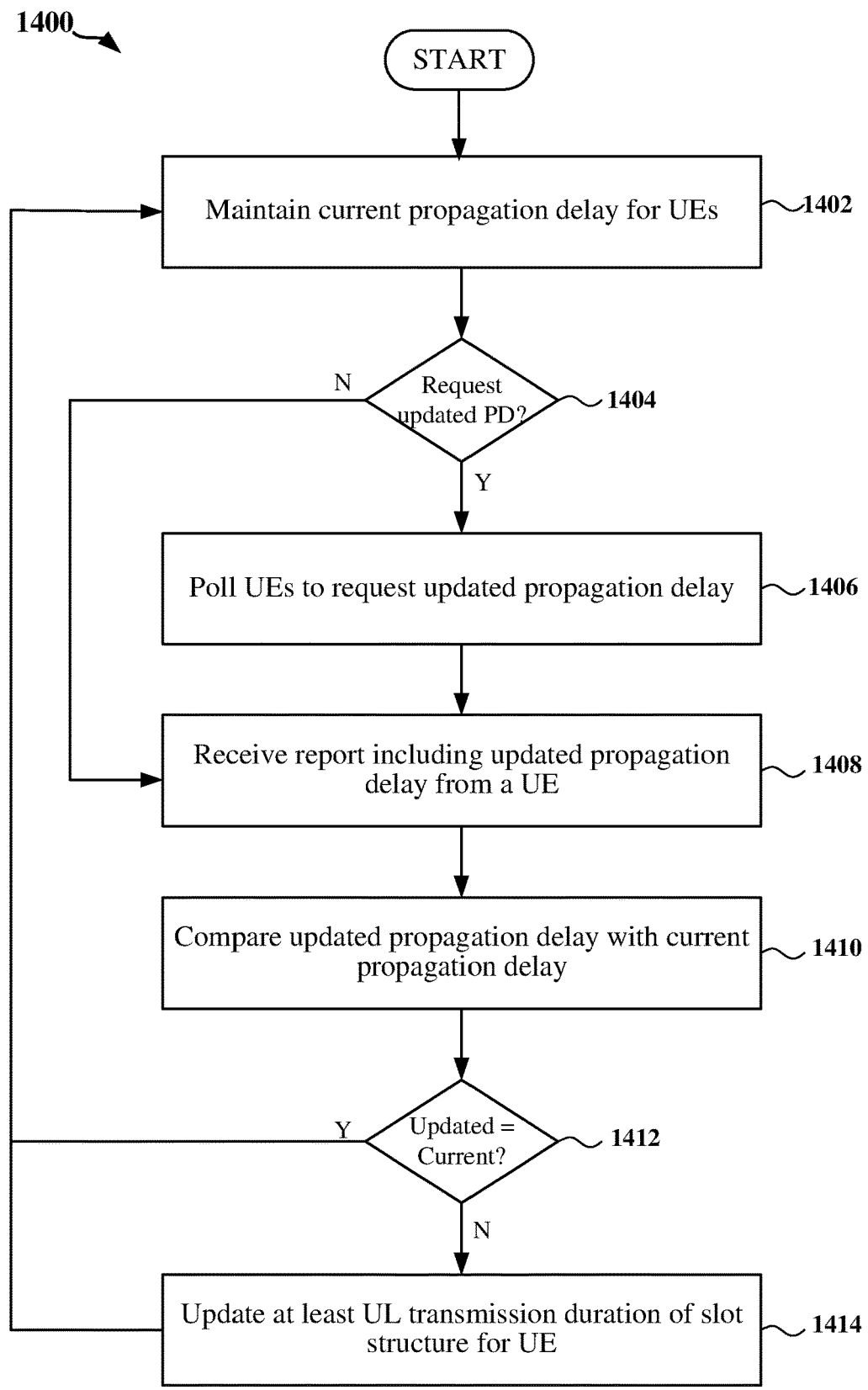
FIG. 14 is a flow chart illustrating another exemplary process for wireless communication with UE-specific slot structures according to some aspects of the present disclosure.

FIG. 14 is a flow chart illustrating another exemplary process 1400 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity (e.g., base station) illustrated in FIG. 5. In some examples, the process 1400 may be carried out by any suitable apparatus or means for carrying out the functions or algorithm described below.

At block 1402, the base station may maintain respective current propagation delays between the base station and each of a plurality of UEs in a cell served by the base station. In some examples, the base station may receive the current propagation delays from the UEs in response to a request from the base station or periodically or aperiodically from the UEs. For example, the memory 505 shown and described above in connection with FIG. 5 may maintain the current propagation delays of the UEs.

At block 1404, the base station may determine whether to request an updated propagation delay from each of the UEs. If the base station determines to request an updated propagation delay (PD) from each of the UEs (Y branch of block 1404), at block 1406, the base station may poll the UEs to request a respective updated propagation delay from each of the UEs. For example, the DL traffic and control channel generation and transmission circuitry 543 and transceiver 510 shown and described above in connection with FIG. 5 may transmit a poll to each of the UEs requesting respective updated propagation delays.

At block 1408, the base station may receive a report including a updated propagation delay from a particular UE. In some examples, the updated propagation delay may be received in response to the poll transmitted at block 1406. In other examples, the updated propagation delay may be received periodically or aperiodically from the UE. For example, the transceiver 510 shown and described above in connection with FIG. 5 above may receive the updated propagation delay from the UE.

At block 1410, the base station may compare the updated propagation delay with the current propagation delay, and at block 1412, determine whether the current propagation delay is equal to the updated propagation delay. In some examples, the base station may determine whether the updated propagation delay differs from the current propagation delay by more than a threshold amount. For example, the slot structure configuration circuitry 541 shown and described above in connection with FIG. 5 may determine whether there is a difference between the current and updated propagation delays for the UE.

If the updated propagation delay differs (e.g., by any amount or by a threshold amount) from the current propagation delay (Y branch of block 1412), at block 1414, the base station may update at least the UL transmission duration of a slot structure (e.g., DL-centric slot structure and/or UL-centric slot structure) for the UE based on the updated propagation delay of the UE. For example, the slot structure configuration circuitry 541 shown and described above in connection with FIG. 5 may configure the slot structure for a UE based on the propagation delay between the base station and the UE. The process then returns to block 1402 to maintain the updated propagation delay as the current propagation delay.

Figure 15:
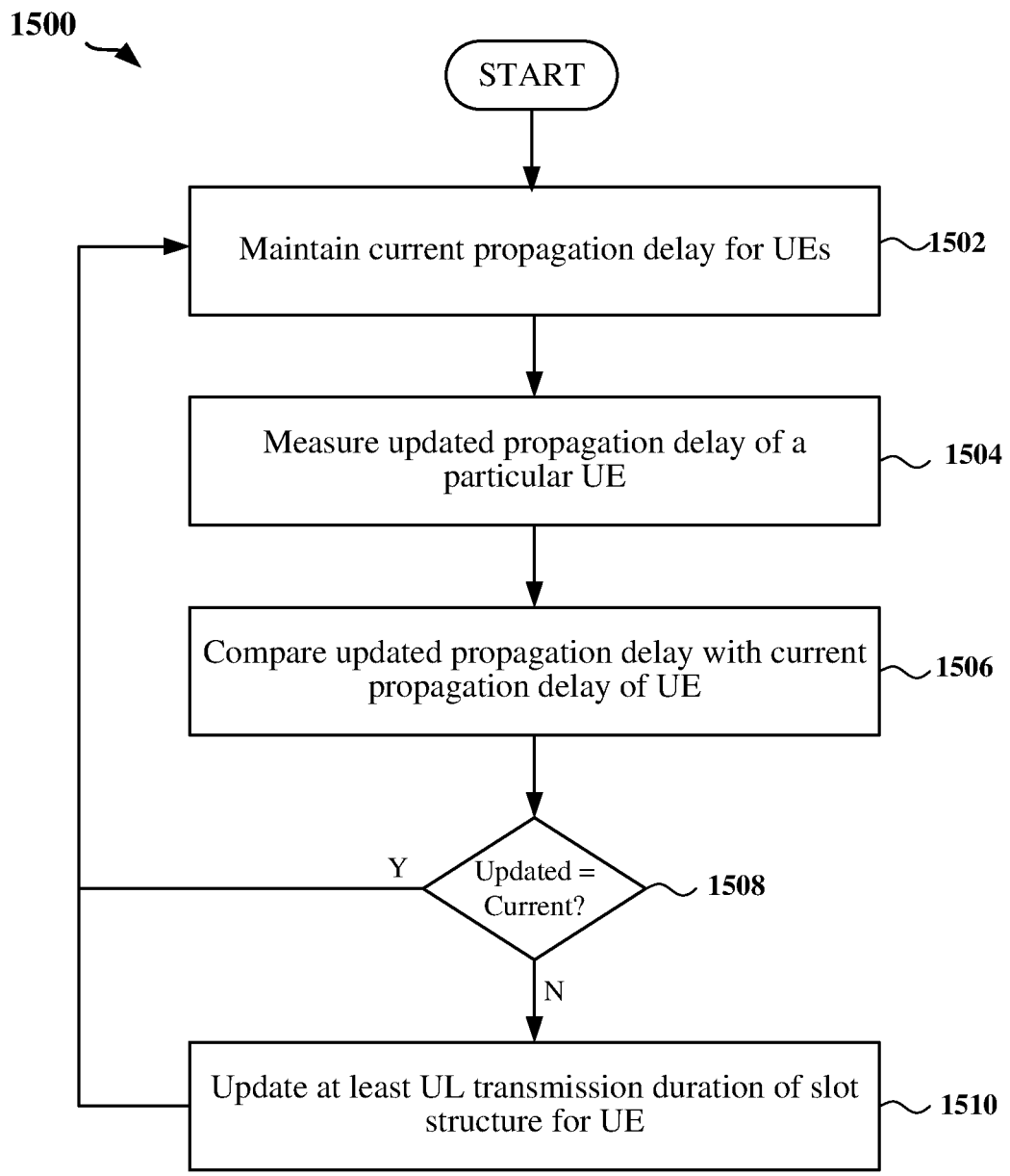
FIG. 15 is a flow chart illustrating another exemplary process for wireless communication with UE-specific slot structures according to some aspects of the present disclosure.

FIG. 15 is a flow chart illustrating another exemplary process 1500 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity (e.g., base station) illustrated in FIG. 5. In some examples, the process 1500 may be carried out by any suitable apparatus or means for carrying out the functions or algorithm described below.

At block 1502, the base station may maintain respective current propagation delays between the base station and each of a plurality of UEs in a cell served by the base station. In some examples, the base station may measure the propagation delays periodically or aperiodically. For example, the memory 505 shown and described above in connection with FIG. 5 may maintain the current propagation delays of the UEs.

At block 1504, the base station may measure an updated propagation delay of a particular UE. For example, the propagation delay measurement circuitry 545 shown and described above in connection with FIG. 5 may measure the updated propagation delay.

At block 1506, the base station may compare the updated propagation delay with the current propagation delay, and at block 1508, determine whether the current propagation delay is equal to the updated propagation delay. In some examples, the base station may determine whether the updated propagation delay differs from the current propagation delay by more than a threshold amount. For example, the slot structure configuration circuitry 541 shown and described above in connection with FIG. 5 may determine whether there is a difference between the current and updated propagation delays for the UE.

If the updated propagation delay differs (e.g., by any amount or by a threshold amount) from the current propagation delay (Y branch of block 1508), at block 1510, the base station may update at least the UL transmission duration of a slot structure (e.g., DL-centric slot structure and/or UL-centric slot structure) for the UE based on the updated propagation delay of the UE. For example, the slot structure configuration circuitry 541 shown and described above in connection with FIG. 5 may configure the slot structure for a UE based on the propagation delay between the base station and the UE. The process then returns to block 1502 to maintain the updated propagation delay as the current propagation delay.

Figure 16:
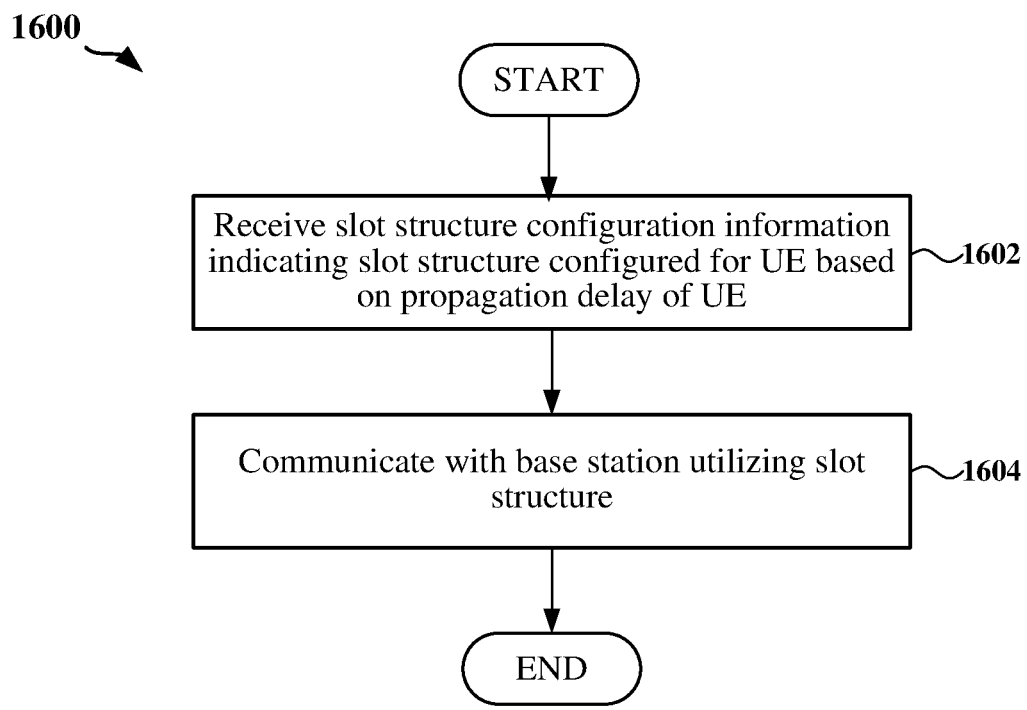
FIG. 16 is a flow chart illustrating another exemplary process for wireless communication with UE-specific slot structures according to some aspects of the present disclosure.

FIG. 16 is a flow chart illustrating another exemplary process 1600 for wireless communication with UE-specific slot structures according to an aspect of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity (e.g., UE) illustrated in FIG. 6. In some examples, the process 1600 may be carried out by any suitable apparatus or means for carrying out the functions or algorithm described below.

At block 1602, the UE may receive slot structure configuration information indicating a slot structure configured for the UE based on the propagation delay between the UE and a base station. In some examples, the slot structure includes an uplink transmission duration selected by the base station based on the propagation delay. For example, the DL traffic and control channel reception and processing circuitry 641 shown and described above in connection with FIG. 6 may receive the slot structure configuration information.

At block 1604, the UE may communicate with the base station utilizing the slot structure. In some examples, the UE may utilize the slot structure when receiving downlink transmissions from the base station and transmitting uplink transmissions from the UE to the base station within a DL-centric slot or an UL-centric slot. For example, the DL traffic and control channel reception and processing circuitry 641, UL traffic and control channel generation and transmission circuitry 642, and transceiver 610 may communicate with the base station utilizing the UE-specific slot structure.

In one configuration, a scheduling entity (e.g., a base station) includes means for configuring an uplink transmission duration of a slot structure for a user equipment of a plurality of user equipment within a cell served by the scheduling entity based on a propagation delay between the base station and the user equipment. The scheduling entity further includes means for transmitting slot structure configuration information indicating the slot structure comprising the uplink transmission duration to the user equipment, and means for communicating with the user equipment utilizing the slot structure.

In one aspect, the aforementioned means for configuring the uplink transmission duration of the slot structure may be the processor(s) 504 shown in FIG. 5 configured to perform the functions recited by the aforementioned means. For example, the aforementioned means for configuring the uplink transmission duration of a slot structure may include the slot structure configuration circuitry 541 shown in FIG. 5. In another aspect, the aforementioned means for transmitting the slot structure configuration information may be the transceiver 510 shown in FIG. 5. In still another aspect, the aforementioned means for communicating with the user equipment utilizing the slot structure may be the transceiver 510 and the processor(s) 504 shown in FIG. 5 configured to perform the functions recited by the aforementioned means. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the present disclosure. Likewise, the term "aspects" does not require that all aspects of the present disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, and 6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication between a scheduling entity and a plurality of scheduled entities in a cell utilizing a time division duplex (TDD) carrier, wherein the TDD carrier comprises a plurality of slots, the method comprising:
configuring an uplink transmission duration comprising a number of symbols of a slot structure specifically for a scheduled entity of the plurality of scheduled entities, wherein the number of symbols is based on a measured propagation delay between the scheduling entity and the scheduled entity;
transmitting slot structure configuration information indicating the slot structure comprising the uplink transmission duration to the scheduled entity; and
communicating with the scheduled entity utilizing the slot structure.

2. The method of claim 1, wherein the slot structure comprises a downlink-centric slot structure and wherein configuring the uplink transmission duration of the downlink-centric slot structure for the scheduled entity further comprises:
configuring the uplink transmission duration of an uplink burst of the downlink-centric slot structure for the scheduled entity based on the measured propagation delay.

3. The method of claim 2, wherein configuring the uplink transmission duration of the uplink burst of the downlink-centric slot structure for the scheduled entity based on the measured propagation delay further comprises:
configuring a number of symbols for the uplink burst of the downlink-centric slot structure based on the measured propagation delay.

4. The method of claim 3, wherein:
the number of symbols is one when the measured propagation delay is greater than a threshold; and
the number of symbols is two when the measured propagation delay is less than the threshold.

5. The method of claim 2, further comprising:
configuring a downlink traffic transmission duration of the downlink-centric slot structure based on a maximum propagation delay in the cell.

6. The method of claim 1, wherein the slot structure comprises an uplink-centric slot structure and wherein configuring the uplink transmission duration of the slot structure for the scheduled entity further comprises:
configuring the uplink transmission duration of both uplink user data traffic and uplink control information of the uplink-centric slot structure for the scheduled entity based on the measured propagation delay.

7. The method of claim 6, further comprising:
configuring a downlink burst of the uplink-centric slot structure for the scheduled entity based on the measured propagation delay, wherein the downlink burst comprises a fixed number of symbols within the cell.

8. The method of claim 7, wherein configuring the downlink burst of the uplink-centric slot structure further comprises:
configuring the downlink burst of the uplink-centric slot structure for the scheduled entity to comprise downlink control information for the scheduled entity in only a first symbol of the downlink burst when the measured propagation delay is greater than a threshold.

9. The method of claim 1, further comprising:
receiving the measured propagation delay from the scheduled entity.

10. The method of claim 9, further comprising:
receiving a report comprising an updated propagation delay measurement from the scheduled entity; and
updating the uplink transmission duration of the slot structure for the scheduled entity when the updated propagation delay measurement differs from a previous propagation delay measurement by more than a threshold.

11. The method of claim 9, further comprising:
polling the plurality of scheduled entities to request a respective propagation delay measurement from each of the plurality of scheduled entities.

12. The method of claim 1, further comprising:
measuring the propagation delay between the scheduling entity and the scheduled entity.

13. The method of claim 12, further comprising:
measuring an updated propagation delay; and
updating the uplink transmission duration of the slot structure for the scheduled entity when the updated propagation delay measurement differs from a previous propagation delay measurement by more than a threshold.

14. The method of claim 1, wherein the configuring the uplink transmission duration of the slot structure further comprises:
configuring a respective uplink transmission duration of the slot structure for each scheduled entity of the plurality of scheduled entities based on a respective measured propagation delay between the scheduling entity and the respective scheduled entity.

15. A scheduling entity within a wireless communication network, comprising:
a processor;
a memory communicatively coupled to the processor; and
a transceiver communicatively coupled to the processor, wherein the processor is configured to:
configure an uplink transmission duration comprising a number of symbols of a slot structure specifically for a scheduled entity of the plurality of scheduled entities, wherein the number of symbols is based on a measured propagation delay between the scheduling entity and the scheduled entity;
transmit slot structure configuration information indicating the slot structure comprising the uplink transmission duration to the scheduled entity; and
communicate with the scheduled entity utilizing the slot structure via the transceiver.

16. The scheduling entity of claim 15, wherein the slot structure comprises a downlink-centric slot structure and wherein the processor is further configured to:
configure the uplink transmission duration of an uplink burst of the downlink-centric slot structure for the scheduled entity based on the measured propagation delay.

17. The scheduling entity of claim 16, wherein the processor is further configured to:
configure a number of symbols for the uplink burst of the downlink-centric slot structure based on the measured propagation delay.

18. The scheduling entity of claim 17, wherein:
the number of symbols is one when the measured propagation delay is greater than a threshold; and
the number of symbols is two when the measured propagation delay is less than the threshold.

19. The scheduling entity of claim 16, wherein the processor is further configured to:
configure a downlink traffic transmission duration of the downlink-centric slot structure based on a maximum propagation delay in the cell.

20. The scheduling entity of claim 15, wherein the slot structure comprises an uplink-centric slot structure and wherein the processor is further configured to:
configure the uplink transmission duration of both uplink user data traffic and uplink control information of the uplink-centric slot structure for the scheduled entity based on the measured propagation delay.

21. The scheduling entity of claim 20, wherein the processor is further configured to:
configure a downlink burst of the uplink-centric slot structure for the scheduled entity based on the measured propagation delay, wherein the downlink burst comprises a fixed number of symbols within the cell.

22. The scheduling entity of claim 21, wherein the processor is further configured to:
configure the downlink burst of the uplink-centric slot structure for the scheduled entity to comprise downlink control information for the scheduled entity in only a first symbol of the downlink burst when the measured propagation delay is greater than a threshold.

23. The scheduling entity of claim 15, wherein the processor is further configured to:
receive a report comprising an updated propagation delay measurement from the scheduled entity; and
update the uplink transmission duration of the slot structure for the scheduled entity when the updated propagation delay measurement differs from a previous propagation delay measurement by more than a threshold.

24. The scheduling entity of claim 15, wherein the processor is further configured to:
poll the plurality of scheduled entities to request a respective propagation delay measurement from each of the plurality of scheduled entities.

25. The scheduling entity of claim 15, wherein the processor is further configured to:
measure an updated propagation delay; and
update the uplink transmission duration of the slot structure for the scheduled entity when the updated propagation delay measurement differs from a previous propagation delay measurement by more than a threshold.

26. A scheduling entity within a wireless communication network, comprising:
means for configuring an uplink transmission duration comprising a number of symbols of a slot structure specifically for a scheduled entity of the plurality of scheduled entities, wherein the number of symbols is based on a measured propagation delay between the scheduling entity and the scheduled entity;
means for transmitting slot structure configuration information indicating the slot structure comprising the uplink transmission duration to the scheduled entity; and
means for communicating with the scheduled entity utilizing the slot structure.

27. The scheduling entity of claim 26, wherein the slot structure comprises a downlink-centric slot structure and wherein the means for configuring the uplink transmission duration of the downlink-centric slot structure for the scheduled entity further comprises:
means for configuring a number of symbols for an uplink burst of the downlink-centric slot structure based on the propagation delay, wherein the number of symbols is one when the measured propagation delay is greater than a threshold, and the number of symbols is two when the measured propagation delay is less than the threshold.

28. The scheduling entity of claim 27, further comprising:
means for configuring a downlink traffic transmission duration of the downlink-centric slot structure based on a maximum propagation delay in the cell.

29. The scheduling entity of claim 26, wherein the slot structure comprises an uplink-centric slot structure and wherein the means for configuring the uplink transmission duration of the slot structure for the scheduled entity further comprises:
means for configuring the uplink transmission duration of both uplink user data traffic and uplink control information of the uplink-centric slot structure for the scheduled entity based on the measured propagation delay.

30. The scheduling entity of claim 29, further comprising:
means for configuring a downlink burst of the uplink-centric slot structure for the scheduled entity based on the measured propagation delay, wherein the downlink burst comprises a fixed number of symbols within the cell.

31. The scheduling entity of claim 30, wherein the means for configuring the downlink burst of the uplink-centric slot structure further comprises:
means for configuring the downlink burst of the uplink-centric slot structure for the scheduled entity to comprise downlink control information for the scheduled entity in only a first symbol of the downlink burst when the measured propagation delay is greater than a threshold.

* * * * *